US008285110B2

(12) United States Patent
Takashima et al.

(10) Patent No.: US 8,285,110 B2
(45) Date of Patent: Oct. 9, 2012

(54) DATA PROCESSING METHOD, DATA PROCESSING DEVICE, INFORMATION RECORDING MEDIUM, AND COMPUTER PROGRAM

(75) Inventors: Yoshikazu Takashima, Tokyo (JP); Motoki Kato, Tokyo (JP)

(73) Assignee: Sony Corporation, Tokyo (JP)

( * ) Notice: Subject to any disclaimer, the term of this patent is extended or adjusted under 35 U.S.C. 154(b) by 1400 days.

(21) Appl. No.: 10/586,367

(22) PCT Filed: Feb. 16, 2005

(86) PCT No.: PCT/JP2005/002322

§ 371 (c)(1),
(2), (4) Date: Jul. 18, 2006

(87) PCT Pub. No.: WO2005/081248

PCT Pub. Date: Sep. 1, 2005

(65) Prior Publication Data

US 2008/0226265 A1 Sep. 18, 2008

(30) Foreign Application Priority Data

Feb. 23, 2004 (JP) ................................ 2004-045757

(51) Int. Cl.
*H04N 9/80* (2006.01)
*H04N 5/94* (2006.01)
*H04N 9/88* (2006.01)
*H04N 5/84* (2006.01)
*H04N 5/89* (2006.01)

(52) U.S. Cl. ........ 386/239; 386/263; 386/333; 386/353; 386/356

(58) Field of Classification Search .................... 386/46, 386/69, 83, 95, 126, 239, 248, 263, 333, 386/337–341, 353–357
See application file for complete search history.

(56) References Cited

U.S. PATENT DOCUMENTS 6,122,436 A * 9/2000 Okada et al. ................. 386/126
(Continued)

FOREIGN PATENT DOCUMENTS

JP 9-259527 10/1997
(Continued)

OTHER PUBLICATIONS

Japanese Office Action mailed May 22, 2012, in Japanese Patent Application No. 2010-106406.

*Primary Examiner* — Thai Tran
*Assistant Examiner* — Hung Dang
(74) *Attorney, Agent, or Firm* — Oblon, Spivak, McClelland, Maier & Neustadt, L.L.P.

(57) ABSTRACT

There is provided an apparatus and a method for generating record data, guaranteeing seamless playback even in a case of occurrence of a jump. In a multilayer disc having a plurality of recording layers, it is configured that an allowable range of an intra-layer jump and an inter-layer jump carried out in a playback processing of an information recording medium is determined and a required time for the intra-layer jump and the inter-layer jump is calculated on the basis of the determined allowable jump range information so as to determine a data configuration requirement such as an allowable minimum consecutive data size of data to be stored in the information recording medium on the basis of the calculated required jump time. With the present structure, seamless playback is made possible even in a case of occurrence of not only an intra-layer jump but also an inter-layer jump.

26 Claims, 17 Drawing Sheets

U.S. PATENT DOCUMENTS

2004/0105351 A1* 6/2004 Ueki .......................... 369/30.23
2005/0238323 A1* 10/2005 Takashima et al. ............. 386/69

FOREIGN PATENT DOCUMENTS

| | | |
|---|---|---|
| JP | 2000-112673 | 4/2000 |
| JP | 2002-157832 | 5/2002 |
| JP | 2002-329385 | 11/2002 |
| JP | 2003-6979 | 1/2003 |
| JP | 2003-22621 | 1/2003 |
| JP | 2003-179876 | 6/2003 |
| JP | 2005-63627 | 3/2005 |
| WO | WO 03/085972 A1 | 10/2003 |

* cited by examiner

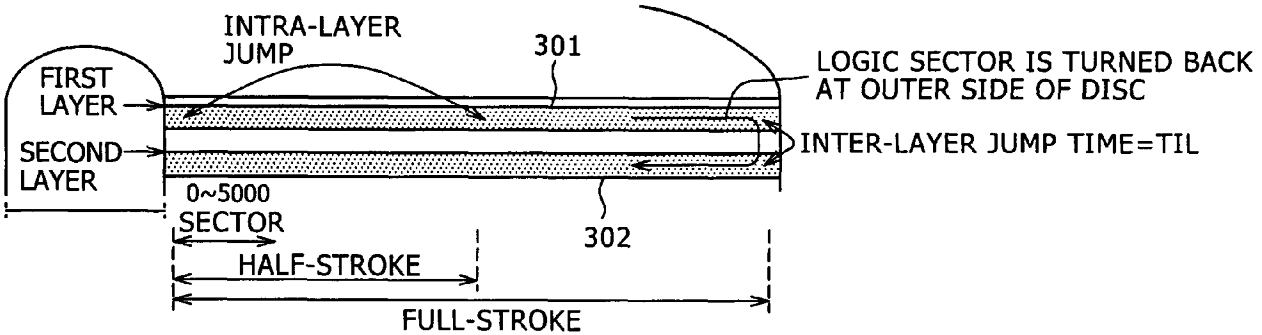

(1)

INTRA-LAYER JUMP TIME $T_{ACC}$

| JUMP DISTANCE | 0-5000 SECTOR | 5000-10000 SECTOR | 10000-20000 SECTOR | 20000-40000 SECTOR | 1/10 STROKE | 1/3 STROKE | HALF-STROKE | FULL-STROKE |
|---|---|---|---|---|---|---|---|---|
| JUMP DATA SIZE [$\times 2^{20}$byte] | 0~10 | 10~20 | 20~40 | 40~80 | 1000~ | 3000~ | 9000~ | 25000 |
| INTRA-LAYER JUMP TIME TACC [ms] | 179 | 210 | 270 | 330 | 650 | 880 | 990 | 1220 |

(2) INTER-LAYER JUMP TIME $T_{IL}$ =360[ms]

(3) OVERHEAD TIME CAUSED AT READING OF ECC BLOCK BOUNDARY $T_{OH}$=20[ms]

TIME DATA SUPPLY IS STOPPED IN OCCURRENCE OF INTER-LAYER JUMP $T_{JUMP}= T_{ACC}+ T_{IL} + T_{OH}$

IN CASE OF Full-stroke INVOLVING INTER-LAYER JUMP $T_{JUMP}$= 1220m s+360ms+20ms = 1600ms

FIG. 8

| COMPARISON PARAMETERS | | (A1) | (A2) | (A3) |
|---|---|---|---|---|
| MAXIMUM JUMP TIME [$T_{JUMP}$] | | 1600ms | 1030ms | 710ms |
| BUFFER SIZE [$S_{RB}$] | | 9.36 MByte(*1) | 6.02 MByte | 4.15 Mbyte |
| MINIMUM DATA ARRANGEMENT SIZE REQUIRED TO GUARANTEE CONSECUTIVE SUPPLY OF DATA BEFORE AND BEHIND JUMP [Usize] | DATA RECORDING RATE (=TS_recording_rate x 192/188) | – | – | – |
| | 5 x 192/188 Mbps | 1.1 MByte | 0.7 MByte | 0.5 Mbyte |
| | 10 x 192/188 Mbps | 2.5 MByte | 1.6 MByte | 1.1 Mbyte |
| | 20 x 192/188 Mbps | 6.3 MByte | 4.1 Mbyte | 2.8 Mbyte |
| | 30 x 192/188 Mbps | 13.6 MByte | 8.7 Mbyte | 6.0 Mbyte |
| | 40 x 192/188 Mbps | 32.0 MByte | 20.6 Mbyte | 14.2 Mbyte |
| | 48 x 192/188 Mbps | 101.5 MByte | 65.3 Mbyte | 45.1 MByte |

(*1)MByte = $2^{20}$byte (CASE 1) MUTUAL SEAMLESS CONNECTION BETWEEN A NUMBER OF CLIPS (a)
... #1End #3End #5End #2Start #4Start #6Start ...
WITH JUMP DISTANCE LIMIT
LSN IN A CASE OF N=3 IN THE FIGURE BELOW (CONNECTION OF 3(ip→3(ip)) CONSECUTIVELY ALLOCATED 2N-2=4 PIECES (#3End, #5End, #2Start, #4Strar) ARE NEEDED TO BE ALLOCATED WITHIN JUMP DISTANCE (2N-2) × (MINIMUM DATA ALLOCATION SIZE) < MAXIMUM JUMP DISTANCE (b)

FIG. 16

| TS_recording rate [RTS] [bits/second] | Minimum data recording size [Usize] (Minimum Extent Size) [Bytes] |
|---|---|
| $5\times10^6$ | $0.5\times2^{20}$ |
| $10\times10^6$ | $1.1\times2^{20}$ |
| $20\times10^6$ | $2.8\times2^{20}$ |
| $30\times10^6$ | $6.0\times2^{20}$ |
| $40\times10^6$ | $14.2\times2^{20}$ |
| $48\times10^6$ | $45.1\times2^{20}$ |

DATA PROCESSING METHOD, DATA PROCESSING DEVICE, INFORMATION RECORDING MEDIUM, AND COMPUTER PROGRAM

TECHNICAL FIELD

The present invention relates to a data processing method, a data processing apparatus, an information recording medium, and a computer program. More specifically, the present invention relates to a data processing method, a data processing apparatus, an information recording medium, and a computer program preventing a break during playback in a case of occurrence of a jump processing including an intra-layer jump (jump within a layer), an inter-layer jump (jump between layers), etc. in playing back content stored in a disc-type recording medium having double-layer data recording structure, for example, to enable seamless content playback.

BACKGROUND ART

It is possible that various software data (hereinafter, referred to as "content") such as audio data of music etc., image data of movies etc., game programs, and various application programs etc. are stored in a recording medium, such as a Blu-ray Disc, to which Blue laser is applied, or DVD (Digital Versatile Disc), MD (Mini Disc), CD (Compact Disc) as digital data. In particular, Blu-ray disc utilizing blue laser is a disc capable of high density recording, in which large capacity video content etc. can be recorded as high definition data.

Such information recording media (recording media) include those having a multilayer structure for storing higher capacity data. For example, there is one having a record data storage area composed of two layers, an upper layer and a lower layer, in a single disc, and data of either layer is selectively played back and data recording is performed, in accordance with focus control of a pick-up.

At the time of playing back content stored in a disc-type information recording medium, there is a case where playback is performed after a jump processing to a position away from a certain data playback position of the disc.

The processing of reading and playing back the content stored in the disc follows procedure steps of:
an acquisition of information from the disc;
a temporary storing (buffering) of acquired information;
a decoding of buffer data; and
an output of decoded data.

The decoding of the buffer data includes a processing such as the decoding of MPEG data if the content is in the form of the MPEG data, or the decoding of encrypted data if the encrypted data is given, for instance.

If a jump processing occurs in a single-layer disc or a multi-layer disc, time is required for performing the jump processing to a position away from a certain data playback position and reading and playing back data from a next read position. If the time is long, playback break may occur.

In a DVD (Digital Versatile Disc) as the disc-type recording medium, a data recording configuration is defined for enabling playback processing without break even in a case of occurrence of a jump in a single recording layer.

However, current DVD standards only define content allocation for guaranteeing seamless playback in a case of occurrence of an intra-layer jump processing within a single layer even in a case of having a multilayer recording structure, and does not take into account playback break in a case of occurrence of an inter-layer jump.

In a case where content over a plurality of layers is stored on such a multilayer type disc, content playback and recording is carried out so that a scene with a whole screen being black and having no sound is allocated at a point switching from the first layer and the second layer so as to avoid giving unnatural impression to a user at a portion incapable of seamless playback.

DISCLOSURE OF THE INVENTION

As mentioned above, although the content allocation enabling seamless playback regarding the inter-layer jump in the disc-type recording medium having a plurality of recording layers is defined, it is not configured to support the inter-layer jump. Accordingly, there is a problem that a break in content playback during the inter-layer jump may occur. The present invention was made in view of these problems and has an object to provide a data processing method, a data processing apparatus, an information recording medium, and a computer program enabling seamless playback even in a case of occurrence of an inter-layer jump as well as an intra-layer jump at the time of playing back a disc-type recoding medium having a plurality of recording layers.

A first aspect of the present invention is a data processing method for determining record data allocation on an information recording medium having a plurality of recording layers, the method characterized by having: an allowable jump range determining step of determining an allowable range of an intra-layer jump and an inter-layer jump performed in a playback processing of the aforementioned information recording medium; a required jump time calculating step of calculating a required time for the intra-layer jump and the inter-layer jump on the basis of allowable jump range information determined in the aforementioned allowable jump range determining step; and a consecutive data allocation size determining step of determining an allowable minimum consecutive data size of data to be stored in the information recording medium on the basis of the required jump time calculated in the aforementioned required jump time calculating step.

Furthermore, in an embodiment of carrying out the data processing method of the present invention, the aforementioned required jump time calculation step is characterized by being a step of calculating, as to an intra-layer jump, a sum of a seek time of a pickup and an overhead time involved in a processing for a read data unit block of the information recording medium, and of calculating, as to an inter-layer jump, a sum of the seek time of the pickup, a pickup adjustment time involved in an inter-layer seek, and the overhead time involved in the processing for the read data unit block of the information recording medium.

Furthermore, in an embodiment of the data processing method of the present invention, the aforementioned consecutive data allocation size determining step is characterized by being a step including an allowable minimum playback time determining step of determining an allowable minimum playback time as a playback time corresponding to the allowable minimum consecutive data size of the data to be stored in the information recording medium, and determining the allowable minimum consecutive data size of the data to be stored in the information recording medium on the basis of the aforementioned allowable minimum playback time.

Furthermore, in an embodiment of the data processing method of the present invention, the aforementioned allowable minimum playback time determining step is characterized by being a step of calculating the allowable minimum playback time [t] on the basis of a jump time [TJUMP], a data read out rate [Rud] from a disc in a drive and a data recording rate [RTS] in accordance with the following equation:

$$t=TJUMP\times Rud/(Rud-RTS);$$

and the aforementioned consecutive data allocation size determining step is characterized by being a step of determining the allowable minimum consecutive data size of the data to be stored in the information recording medium on the basis of the allowable minimum playback time [t] calculated by the aforementioned equation in accordance with the following equation:

$$Usize=t\times RTS.$$

Furthermore, in an embodiment of the data processing method of the present invention, the aforementioned data processing method is characterized by further having a data setting processing step of identifying jump origin data and jump destination data that can be generated in a playback processing of the stored data in the information recording medium and setting a distance between the jump origin data and the jump destination data within the allowable jump range determined in the aforementioned allowable jump range determining step on the basis of the identification information.

Furthermore, in an embodiment of the data processing method of the present invention, the aforementioned data setting processing step carries out a processing of setting the distance between the jump origin data and the jump destination data within the aforementioned allowable jump range by an interleave processing of clip data set as a data unit of storage target data on the information recording medium.

Furthermore, in an embodiment of the data processing method of the present invention, the data processing method is characterized by further having a data recording step of performing data recording on the information recording medium in a data unit larger than or equal to the consecutive data allocation size determined in the aforementioned consecutive data allocation size determining step.

Furthermore, a second aspect of the present invention is a data processing apparatus for determining record data allocation on an information recording medium having a plurality of recording layers, the apparatus characterized by having: allowable jump range determining means that determines an allowable range of an intra-layer jump and an inter-layer jump performed in a playback processing of the aforementioned information recording medium; required jump time calculating means that calculates a required time for the intra-layer jump and the inter-layer jump on the basis of allowable jump range information determined in the aforementioned allowable jump range determining means; and consecutive data allocation size determining means that determines an allowable minimum consecutive data size of data to be stored in the information recording medium on the basis of the required jump time calculated in the aforementioned required jump time calculating means.

Furthermore, in an embodiment of the data processing apparatus of the present invention, the aforementioned required jump time calculating means is characterized by being configured to calculate, as to an intra-layer jump, a sum of a seek time of a pickup and an overhead time involved in a processing for a read data unit block of the information recording medium, and, as to an inter-layer jump, a sum of the seek time of the pickup, a pickup adjustment time involved in an inter-layer seek, and the overhead time involved in the processing for the read data unit block of the information recording medium.

Furthermore, in an embodiment of the data processing apparatus of the present invention, the aforementioned data processing apparatus is characterized by further including allowable minimum playback time determining means that determines an allowable minimum playback time as a playback time corresponding to an allowable minimum consecutive data size of the data to be stored in the information recording medium, and the aforementioned consecutive data allocation size determining means is characterized by being configured to determine the allowable minimum consecutive data size of the data to be stored in the information recording medium on the basis of the aforementioned allowable minimum playback time.

Furthermore, in an embodiment of the data processing apparatus of the present invention, the aforementioned allowable minimum playback time determining means is characterized by being configured to calculate the allowable minimum playback time [t] on the basis of a jump time [TJUMP], a data read out rate [Rud] from a disc in a drive and a data recording rate [RTS] in accordance with the following equation:

$$t=TJUMP\times Rud/(Rud-RTS);$$

and the aforementioned consecutive data allocation size determining means is characterized by being configured to determine the allowable minimum consecutive data size of the data to be stored in the information recording medium on the basis of the allowable minimum playback time [t] calculated by the aforementioned equation in accordance with the following equation:

$$Usize=t\times RTS.$$

Furthermore, in an embodiment of the data processing apparatus of the present invention, the aforementioned data processing apparatus is characterized by further having data setting processing means that identifies jump origin data and jump destination data that can be generated in the playback processing of the stored data in the information recording medium and setting a distance between the jump origin data and the jump destination data within the allowable jump range determined in the aforementioned allowable jump range determining means on the basis of the identification information.

Furthermore, in an embodiment of the data processing apparatus of the present invention, the aforementioned data setting processing means carries out a processing of setting the distance between the jump origin data and the jump destination data within the aforementioned allowable jump range by an interleave processing of clip data set as a data unit of storage target data on the information recording medium.

Furthermore, in an embodiment of the data processing apparatus of the present invention, the data processing apparatus is characterized by further having data recording means of performing data recording on the information recording medium in a data unit larger than or equal to the consecutive data allocation size determined in the aforementioned consecutive data allocation size determining means.

Furthermore, a third aspect of the present invention is an information recording medium having a plurality of recording layers, characterized by having a structure storing therein data larger than or equal to an allowable minimum consecutive data size determined on the basis of a required jump time of an intra-layer jump and an inter-layer jump executed in a playback processing of the information recording medium.

Furthermore, in an embodiment of the information recording medium of the present invention, the aforementioned required jump time is characterized by being, as to an intra-layer jump, a sum of a seek time of a pickup and an overhead time involved in a processing for a read out data unit block of the information recording medium, and, as to an inter-layer jump, a sum of the seek time of the pickup, a pickup adjustment time involved in an inter-layer seek, and the overhead time involved in the processing for the read out data unit block of the information recording medium.

Furthermore, in an embodiment of the information recording medium of the present invention, the aforementioned allowable minimum consecutive data is characterized by being in a size determined on the basis of an allowable minimum playback time as a playback time corresponding the allowable minimum consecutive data size of the data to be stored in the information recording medium.

Furthermore, in an embodiment of the information recording medium of the present invention, the aforementioned information recording medium is characterized by further having a data allocation in which a distance between jump origin data and jump destination data in a jump processing that can be generated in a playback processing of the stored data of the information recording medium is set within an allowable jump range.

Furthermore, in an embodiment of the information recording medium of the present invention, the aforementioned information recording medium is characterized by further having a data allocation in which the distance between the jump origin data and the jump destination data is set within the aforementioned allowable jump range by an interleave processing of clip data set as a data unit of storage target data on the information recording medium.

Furthermore, a fourth aspect of the present invention is a computer program for executing a data processing for determining record data allocation on an information recording medium having a plurality of recording layers, the computer program characterized by having: an allowable jump range determining step of determining an allowable range of an intra-layer jump and an inter-layer jump performed in a playback processing of the aforementioned information recording medium; a required jump time calculating step of calculating a required time for the intra-layer jump and the inter-layer jump on the basis of allowable jump range information determined in the aforementioned allowable jump range determining step; and a consecutive data allocation size determining step of determining an allowable minimum consecutive data size of data to be stored in the information recording medium on the basis of the required jump time calculated in the aforementioned required jump time calculating step.

Furthermore, a fifth aspect of the present invention is a data processing method for determining record data allocation on an information recording medium, the method characterized by having: a data size determining step of determining a data size as a minimum size of data to be stored in the information recording medium on the basis of allowable jump range information determined as an allowable range of a jump processing in a playback processing of the aforementioned information recording medium; and a data allocation determining step of determining a data recording configuration in which a data block having the aforementioned data size is in a data allocation capable of being played back in the jump processing within the aforementioned allowable jump range.

Furthermore, in an embodiment of the data processing method of the present invention, the aforementioned data size determining step is characterized by being a step of determining a data size as the minimum size of data to be stored in the information recording medium on the basis of the allowable jump range information of an intra-layer jump and an inter-layer jump.

Furthermore, in an embodiment of the data processing method of the present invention, the aforementioned data size determining step is characterized by being a step of determining a data size on the basis of a table in which a data recording rate [RTS] is made corresponding to the allowable minimum data size of the data to be stored in the information recording medium.

Furthermore, in an embodiment of the data processing method of the present invention, the aforementioned data size determining step is characterized by being a step of determining a data size on the basis of a relational expression between a data recording rate [RTS] and the allowable minimum data size of the data to be stored in the information recording medium.

Furthermore, in an embodiment of the data processing method of the present invention, the aforementioned relational expression is characterized by being an expression shown in the following equation:

$$S_{EXTENT}[\text{byte}] \geq \frac{T_{JUMP}[\text{ms}] \times R_{UD}[\text{bps}]}{1000 \times 8} \times \frac{\text{TS\_recording\_rate[bps]} \times 192}{R_{UD}[\text{bps}] \times 188 - \text{TS\_recording\_rate[bps]} \times 192},$$

setting that an allowable minimum data size of the data to be stored in the information recording medium is $S_{EXTENT}$, a total jump time is $T_{JUMP}$, a data read out rate from a disc in a drive is $R_{ud}$, and a data recording rate [RTS] is $TS_{recording\ rate}$.

Furthermore, a sixth aspect of the present invention is a data processing apparatus which determines record data allocation on an information recording medium, the apparatus characterized by having: a data size determining apparatus which determines a data size as a minimum size of data to be stored in the information recording medium on the basis of allowable jump range information determined as an allowable range of a jump processing in a playback processing of the aforementioned information recording medium; and a data allocation determining apparatus which determines a data recording configuration in which a data block having the aforementioned data size is so allocated as to be playable in the jump processing within the aforementioned allowable jump range.

Furthermore, in an embodiment of the data processing apparatus of the present invention, the aforementioned data size determining apparatus is characterized by being configured to determine a data size as the minimum size of data to be stored in the information recording medium on the basis of the allowable jump range information of an intra-layer jump and an inter-layer jump.

Furthermore, in an embodiment of the data processing apparatus of the present invention, the aforementioned data size determining apparatus is characterized by being configured to determine a data size on the basis of a table in which a data recording rate [RTS] is made corresponding to the allowable minimum data size of the data to be stored in the information recording medium.

Furthermore, in an embodiment of the data processing apparatus of the present invention, the aforementioned data size determining apparatus is characterized by being configured to determine a data size on the basis of a relational expression between a data recording rate [RTS] and the allowable minimum data size of the data to be stored in the information recording medium.

Furthermore, in an embodiment of the data processing apparatus of the present invention, the aforementioned relational expression is characterized by being an expression shown in the following equation:

$$S_{EXTENT}[\text{byte}] \geq \frac{T_{JUMP}[\text{ms}] \times R_{UD}[\text{bps}]}{1000 \times 8} \times \frac{\text{TS\_recording\_rate[bps]} \times 192}{R_{UD}[\text{bps}] \times 188 - \text{TS\_recording\_rate[bps]} \times 192},$$

setting that the allowable minimum data size of the data to be stored in the information recording medium is $S_{EXTENT}$, a total jump time is $T_{JUMP}$, a data read out rate from a disc in a drive is $R_{ud}$, and the data recording rate [RTS] is $TS_{recording\ rate}$.

Furthermore, a seventh aspect of the present invention is a computer program for executing a record data allocation determining processing on an information recording medium, the computer program characterized by having: a data size determining step of determining a data size as a minimum size of data to be stored in the information recording medium on the basis of allowable jump range information determined as an allowable range of a jump processing in a playback processing of the aforementioned information recording medium; and a data allocation determining step of determining a data recording configuration in which a data block having the aforementioned data size is so allocated as to be playable in the jump processing within the aforementioned allowable jump range.

It is noted that the computer program of the present invention is available as a computer program that is capable of being provided by a storage medium that provides various programs and codes in a computer-readable form for a computer system that allows various program codes to run, or via a communication medium, more specifically, a recording medium such as a CD, an FD, and an MO etc., or the communication medium such as a network etc. A processing suited to the program may be implemented on the computer system by providing the above program in the computer-readable form.

The foregoing and other objects, features and advantages of the present invention will be apparent from a detailed description with reference to the following embodiments and the accompanying drawings of the present invention. Incidentally, it is to be understood that the system stated in the present specification is in the form of a logical aggregate of more than one unit, and the units contained in the aggregate are not always incorporated in an identical casing.

According to the configuration of the present invention, for example, in a multilayer disc, such as a Blu-ray disc, a DVD disc and the like, having a plurality of recording layers, an allowable range of an intra-layer jump and an inter-layer jump both carried out in a playback processing of an information recording medium is determined and a required time for the intra-layer jump and the inter-layer jump is calculated on the basis of the determined allowable jump range information so as to determine a data configuration condition such as an allowable minimum consecutive data size of data to be stored in the information recording medium on the basis of the calculated required jump time. Thus, generation of record data, data recording and playback guaranteeing seamless playback even in a case of occurrence of not only the intra-layer jump but also the inter-layer jump at the time of playback a disc-type recoding medium having a plurality of recording layers are made possible.

Furthermore, data allocation conditions supporting jump models defining various allowable jump conditions can be acquired, and performing data recording in accordance with a data allocation condition supporting each allowable jump condition enables generation of record data, data recording and playback guaranteeing a playback processing without data break at the time of the intra-layer jump and the inter-layer jump possibly occurring during playback.

Furthermore, according to the present invention, it is possible to clearly calculate a level of degradation of editorial flexibility due to increased read out buffer size caused by increase of the allowable jump time (distance) and increased size of the consecutive data allocation size [Usize], so that determination of an optimum buffer size and consecutive data allocation size [Usize] is made possible by carrying out handling suitable for each level. Thus, performing content recording on the basis of the determined information enables generation of record data, data recording and playback guaranteeing a playback processing without data break.

Furthermore, according to the configuration of the present invention, a data configuration incapable of consecutive playback at the time of jump due to the increased number of consecutive clips and difference in data length of the consecutive clips is analyzed to set a parameter having, for example, relation between a maximum number of consecutive clips, or a length of a clip to be used for a multi-story, and data size as a limit value and to produce content based on authoring software in which the parameter is set. Accordingly, generation of record data, data recording and playback assuring a playback processing without data break at the time of the intra-layer jump and the inter-layer jump possibly occurring during playback are enabled.

BRIEF DESCRIPTION OF DRAWINGS

FIG. 3 shows views for explaining conditions for realizing seamless playback in a case of occurrence of an inter-layer jump in a disc having a plurality of recording layers.

FIG. 8 is a view showing data allocation conditions corresponding to each values of a buffer size (SRB) and a data recording rate (RTS) required for each of the plurality or jump models (A1)-(A3) explained with reference to FIG. 6.

FIG. 16 is a view showing an example of a table in which a data recording rate [RTS] and an allowable minimum data size of the data to be stored in the information recording medium are corresponded.

BEST MODES FOR CARRYING OUT THE INVENTION

Details of a data processing method, a data processing apparatus, an information recording medium, and a computer program are now described with reference to the drawings.

To perform surely a seamless playback processing in a case of occurrence of the jump processing in the course of the playback for the disc-type information recording medium containing the content, it is necessary to define a content storage location and to set a maximum jump distance as a distance that allows the occurrence of the jump, thereby performing a storage of the content in conformity with the setting of the distance.

In a DVD (Digital Versatile Disc) specified as the disc-type recording medium, standards of the drive that performs the disc playback involve drive standards established such that a period between a termination of the playback at a jump start point and a start of the playback at a jump destination is limited to a prescribed period of time or shorter in order to permit the seamless playback in a case of the occurrence of the jump within an individual recording layer.

Figure 1:
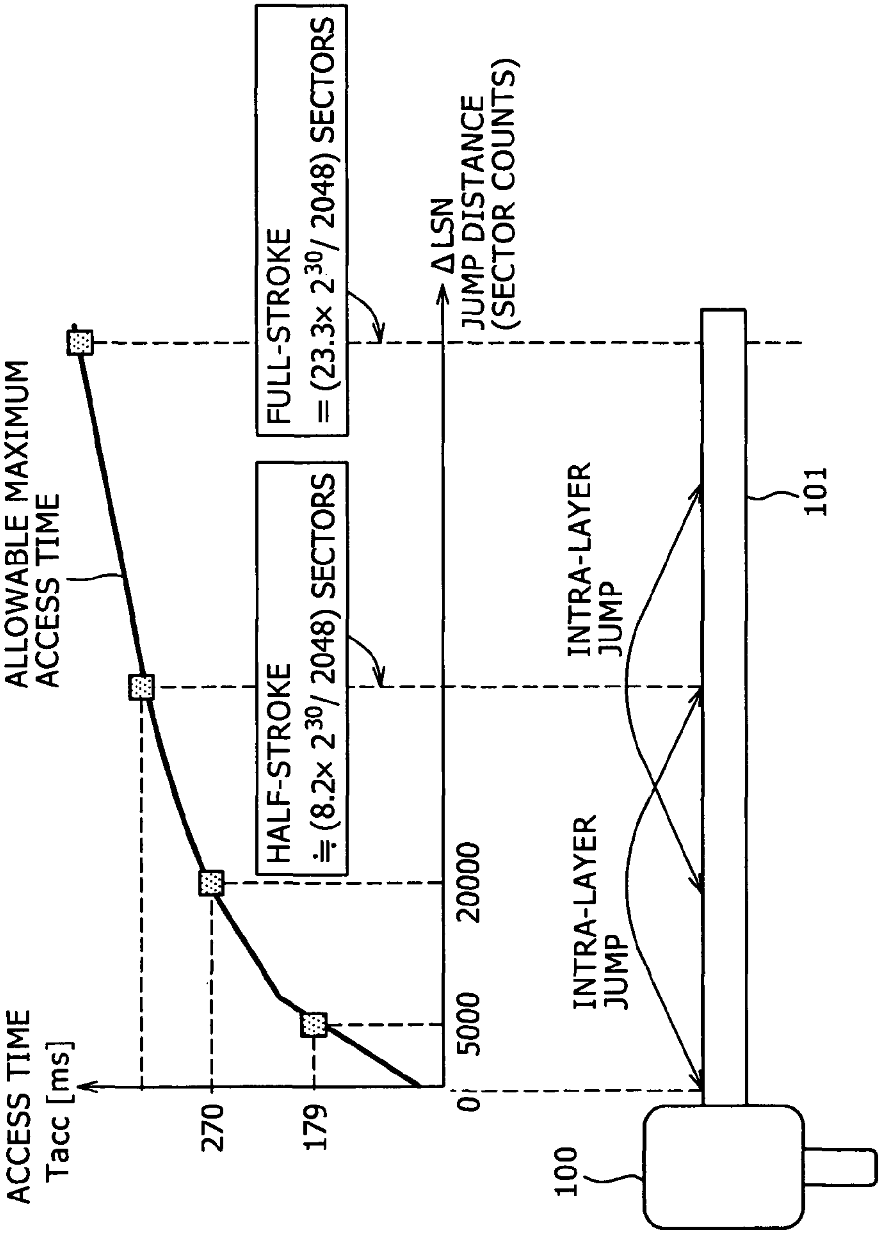
FIG. 1 is a view for explaining a drive standard defining a jump processing at the time of disc playback and a time period between a termination of the playback at a jump start point and a start of the playback at a jump destination.

This drive standard will be explained with reference to FIG. 1. In FIG. 1, a disc 101 mounted on a spindle motor 100 rotates, and a not-shown pickup plays back and records data. The content stored in the disc are contained in sector units corresponding to the prescribed data size.

In a graph shown in FIG. 1, a horizontal axis shows the jump distance indicated by sector numbers, and a vertical axis shows an access time [ms]. As shown in the graph of FIG. 1, the drive standards in the DVD prescribe an allowable maximum access time at the time of the occurrence of the jump corresponding to the prescribed sector numbers.

If the drive apparatus capable of gaining the access involving the jump processing at the allowable maximum access time shown in FIG. 1 or below is given, the content would be stored in the DVD that conforms to the standards so as to guarantee the seamless playback even if the jump occurs within the identical layer at the time of the playback of the content. That is, the recording of the content is supposed to be performed in a condition where the content stored in the disc are allocated so as to cause no jump processing at a location beyond the allowable maximum access time as shown in the graph of FIG. 1.

However, as described above, there is no content storage definition for enabling seamless playback addressing occurrence of an inter-layer jump in a disc having a plurality of recording layers, such as a disc having two recording layers.

The present invention suggests a content allocation for enabling seamless playback even in a case of occurrence of the inter-layer jump during content playback in a disc having a plurality of recording layers.

It is noted that embodiments in the following give a consideration on an assumption that a Blu-ray disc specified as a disc available for recording and playback with blue laser applied is taken as one instance of a disc-type information recording medium. A storage format of content stored in the Blu-ray disc is described with reference to FIG. 2.

Figure 2:
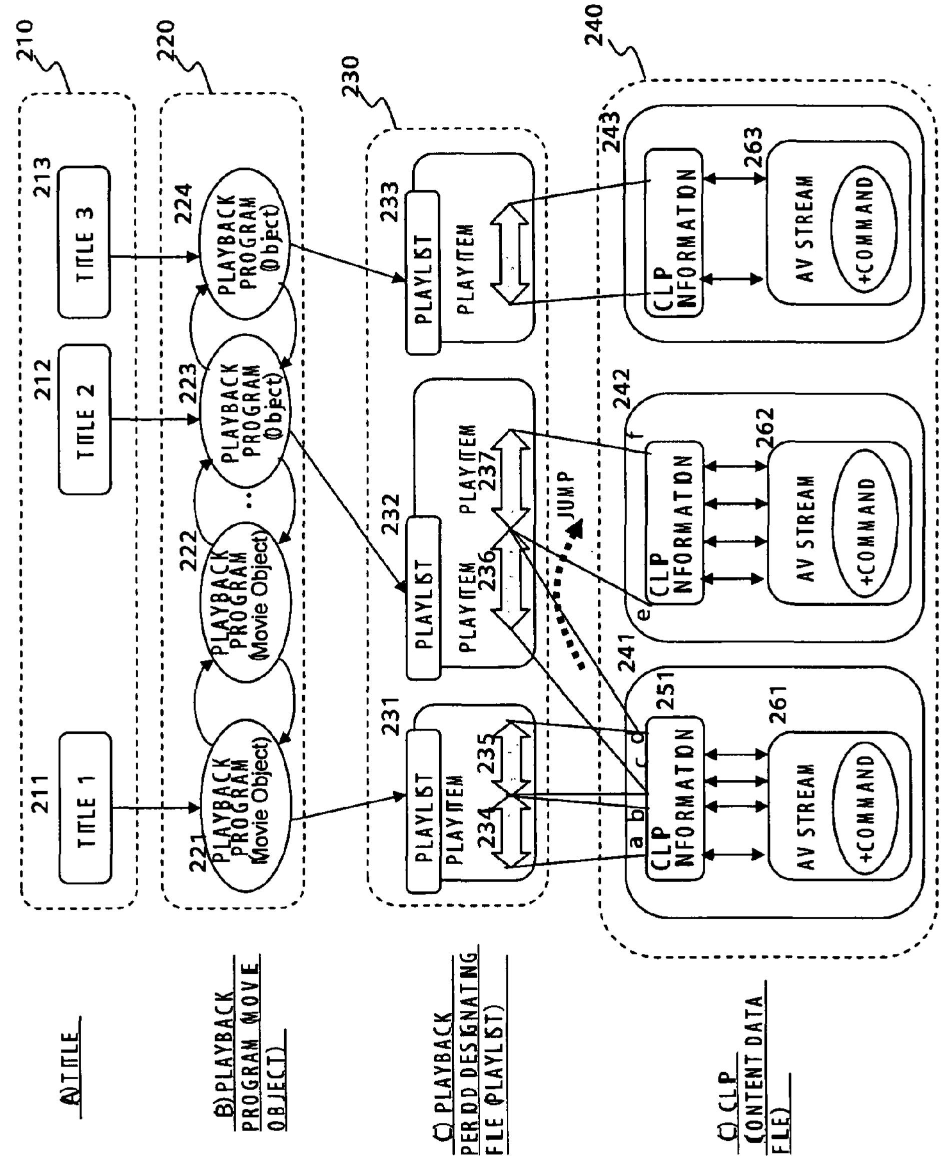
FIG. 2 is a view for explaining a storage format of content stored in the Blu-ray disc.

The information recording medium contains, as shown in FIG. 2, AV streams of moving image content such as HD (High Definition) movie content specified as high definition moving image data, for instance.

As shown in FIG. 2, content to be stored in conformity with the Blu-ray disc ROM standard format has a hierarchical configuration in conformity with the Blu-ray disc ROM standard format. That is: (A) Title 210, (B) Playback Program (Movie Object), (C) Playback Period Designating File (PlayList) 230, and (C) Clip (Content Data File) 240.

(A) Title 210 is index data that a user can designate and a playback processing designating any one of Titles 211-213 is carried out at the time of content playback. Any one of Playback program 221-224 set as (B) Playback program 220 is related to each of the Titles 211-213 so that, in accordance with title designation, a playback processing according to the playback program related thereto is started.

(C) Playback period designating file (PlayList) 230 has a plurality of playback period designating files (PlayLists) 231, 232, 233. Each of the playback period designating files (PlayLists) 231, 232, 233 is configured to have more than one PlayItem that selects either of more than one AV stream data file contained in the Clip (the content data file) 240, and designates specific data portions of the selected data file as a playback start point and a playback end point, and a selection of one playback period designating file (PlayList) brings the playback into execution through a determination of a playback sequence according to the play item contained in the selected playback period designating file (PlayList).

(D) Clip (content data file) 240 has Clips 241, 242, 243, each of which is a segmented content data file, and each Clip 241 has an AV (Audio-Visual) stream file 261 and a clip information file 251.

The clip information file 251 is a data file containing attribute information relating to the AV (Audio-Visual) stream file 261. The AV (Audio-Visual) stream file 261 is available as MPEG-TS (Moving Picture Experts Group-Transport Stream) data, for instance, and is supposed to be of a data structure obtained by multiplexing each information piece such as the image (video), voice (audio) and subtitle data etc. together. Further, there are instances where command information required for a control of a playback apparatus at the time of the playback is also multiplexed.

The playback of the content, when performed through the selection of the playback period designating file (PlayList) 231, for instance, causes the PlayItem 234 made corresponding to the playback period designating file (PlayList) 231 to provide a playback start point a and a playback end point b in the Clip 241 and the PlayItem 235 to provide a playback start point c and a playback end point d, so that specific data areas a-b and c-d of the AV stream file 261 specified as the content contained in the Clip 241 are supposed to be played back.

In addition, when content is played back through selection of the playback period designating file (PlayList) 232, the play item corresponded to the playback period designating file (PlayList) 232 has the playback start point c and the playback end point d in the Clip 241 and the PlayItem 237 has a playback start point e and a playback end point f in the Clip 242 so that the specific data areas c-d of the AV stream file 261 being content contained in the clip 241 and specific data areas e-f of the AV stream file 262 being content contained in the Clip 242 are to be played back.

In a case where the content stored in the disc are stored in a unit of each AV stream 261, 262, 263, there may be a case where a single AV stream is, for example, stored in a consecutive sector area and another AV stream is not stored in the consecutive sector area but is stored in a position away by a predetermined sectors. In such a data storage configuration, when the above-described playback period designating file (PlayList) 232 is selected to perform content playback, two different AV files are required to be played back in the specific data areas c-d of the AV stream file 261 contained in the Clip 241 and the specific data areas e-f of the AV stream file contained in the Clip 242 so that a jump processing occurs at a switching point of the AV files. The present invention is to enable data recording and playback with no break in the playback content upon occurrence of such a jump processing.

Next, with reference to FIG. 3, requirements for realizing seamless playback in a case of occurrence of an inter-layer jump in a disc having a plurality of recording layers will be described.

FIG. 3(*a*) shows a disc configuration of a double-layer structure. The data is recorded in a first layer 301 and a second layer 302 in sector units specified as content data recording units.

The jump processing suited to the playback mode of the content occurs at the time of the playback of the disc containing the content. There may be a case of carrying out a playback processing of different AV streams as described with reference to FIG. 2 above.

It is noted that the jump processing involved in the playback of the disc of the structure having a plurality of recording layers is available in two modes, that is, one jump processing between the recording areas in the identical layer and the other between the recording areas in the different layers. The present invention is to realize the configuration of enabling the seamless playback in the occurrence of the inter-layer jump, and the calculation of a total time required at the time of the inter-layer jump is performed.

FIG. 3(1) is a table showing one example of an intra-layer jump time [TACC] suited to the jump distance in the disc configuration having one layer whose recording capacity is 23.3 Gbytes. The table lists, from the top, [Jump Distance (sectors or strokes)], [Data Size (MB) corresponding to the jump distance], and [Jump Time (ms)]. The [Jump Time (ms)] is equivalent to a time required for the seek of the pickup of the drive apparatus that performs the playback of the Blu-ray disc, that is, a seek time.

In the table of FIG. 3(1), the [Jump Distance (sectors or strokes)] is set to give the jump distance of 40000 sectors or below in a sector representation, and the jump distance of a 1/10-stroke or above in a stroke representation. A full-stroke is equivalent to a stroke in a range of the disc from an innermost side to an outermost side as shown in FIG. 3(*a*).

It is noted that a relation of 40000 sectors <1/10-stroke exists between the jump distance of the 40000 sectors and the jump distance of the 1/10-stroke, that is, with left-to-right entries in the table, the jump distance increases. A reason why the entries of a large jump distance are given in the sector representation is that there is a large difference in the sector number between an inner and an outer sides of the disc so that a use of the sector representation for the large jump distance causes a range of the sector numbers to be increased too much.

Further, with regard to the jump distances of the 1/10-stroke, a 1/3-stroke and a half-stroke, a data size is given in a lower limit representation. This is because there is a difference in the corresponding data size between the inner and the outer sides of the disc even in the same case of the 1/10-stroke, so that the lower limit representation is given using a calculated value obtained at the inner side where the data size is minimized. It is noted that the lower limit of the data size corresponding to the specific jump distance, if being given, is supposed to be sufficient to determine data allocation conditions described later, resulting in no description on an upper limit of the corresponding data size.

The jump distance of the full-stroke corresponds to the stroke in the range of the disc from the innermost side to the outermost side, for instance, and the jump data size at the time of the full-stroke reaches 23.3 Gbytes. The time required for the intra-layer full-stroke jump, that is, the intra-layer jump time [TACC] is 1220 ms.

In a case of the jump distance in the range of 0 to 5000 sectors, the jump data size is in the range of 0 to $10\times2^{20}$ Bytes, and the time required for the intra-layer jump, that is, the intra-layer jump time [TACC] is 179 ms.

FIG. 3(2) shows a measured value of an inter-layer jump time [TIL] in a certain drive apparatus. That is, the inter-layer jump time [TIL]=360 ms. This value corresponds to a time required for an adjustment such as a focus control of the pickup in the case of a change of a playback position to different layers of the first layer 301 and the second layer 302 in FIG. 13(*a*) in the drive apparatus that performs the playback of the Blu-ray disc.

FIG. 3(3) shows a measured value of an overhead time [TOH] that is caused at the time when reading an ECC block boundary in the certain drive apparatus. That is, [TOH]=20 ms.

For the reading of the content stored in the Blu-ray disc, there is provided a setting of a prescribed data read unit. The data read unit is called an ECC block. The ECC block is in the form of a block composed of user data formed with AV stream data, for instance, specified as actual content data, user control data (UCD) containing various control data, and parity data etc. for the error correction.

The playback of the content, when being performed, requires that the data should be read in ECC block units to perform the data processing such as the error correction based on a parity in the ECC block units.

The execution of the jump in the course of the data playback brings about a need for the processing for two different ECC blocks, that is, one ECC block at a jump source and the other at a jump destination. The overhead time involved in the processing for the ECC blocks is assumed to be the overhead time [TOH] that is caused at the time when reading the ECC block boundary shown in FIG. 3(3).

As described above, the execution of the inter-layer jump causes the intra-layer jump time [TACC] shown in FIG. 3(1), the inter-layer jump time [TIL] shown in FIG. 3(2), and the ECC block read overhead time [TOH] shown in FIG. 3(3), and as a result, a total inter-layer jump time [TJUMP] specified as a time the break of the reading of the data from the disc is caused in the execution of the inter-layer jump is calculated as follows:

$$TJUMP=TACC+TIL+TOH.$$

Details of the overhead time involved in the ECC block processing that occurs in the jump processing will be described with reference to FIG. 4.

Figure 4:
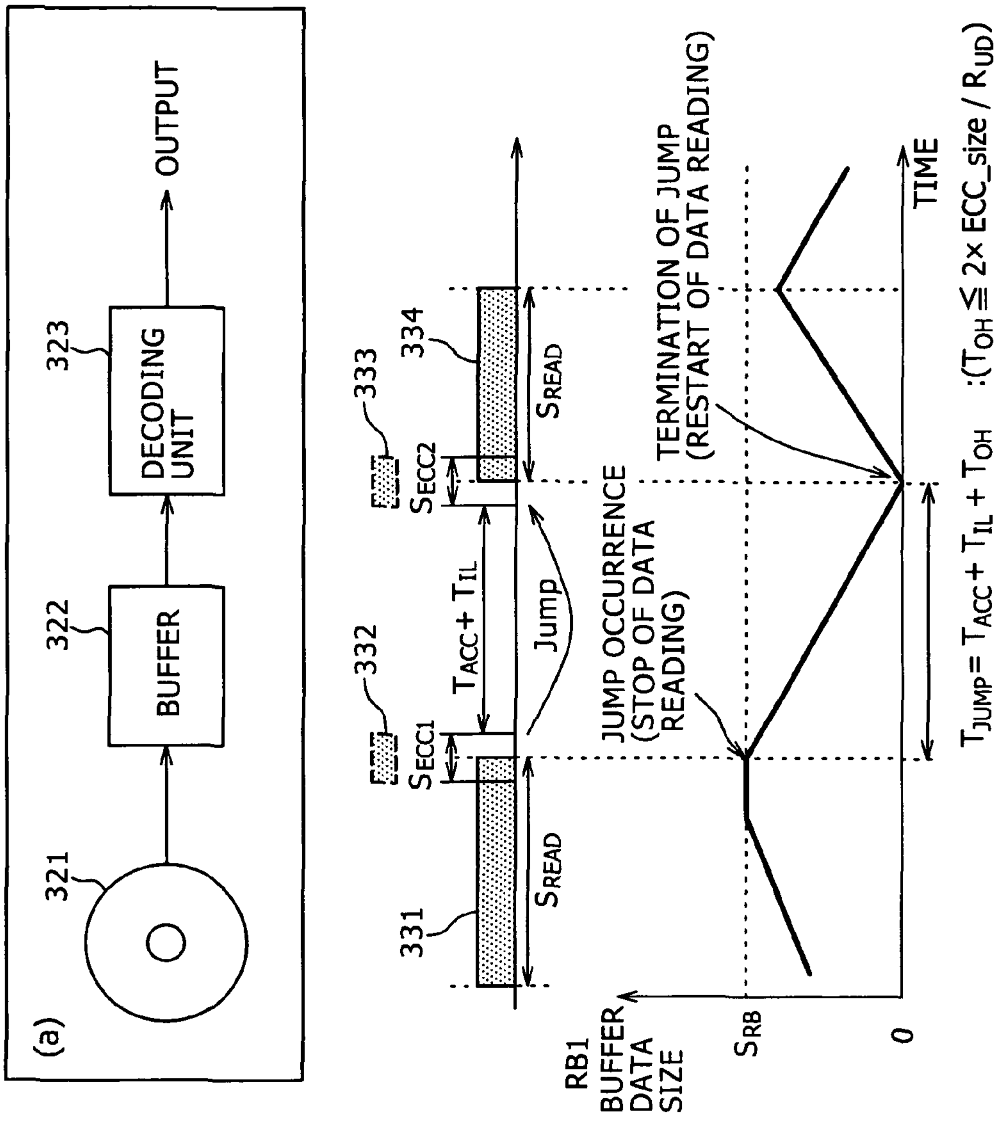
FIG. 4 shows view for explaining an overhead time caused by an ECC block processing occurred during a jump processing in detail.

As shown in FIG. 4(*a*), the processing of reading and playing back the data from the disc firstly allows the data to be read from a disc 321 in the ECC block units into a buffer 322. Further, a decoding is applied in a decoding unit 323 to the data outputted from the buffer. It is noted that the processing such as the error correction is performed prior to the decoding, although not shown in the drawing. The decoding unit 323 performs the decoding in a condition where the adjustment of the playback order and the playback time is done according to the time stamp information set in the transport stream (TS) contained in the AV stream data within the ECC block, and decoded data is outputted as playback content.

The decoding unit 323 is capable of performing the playback consecutively as far as the ECC blocks stored in the buffer 322 exist. A graph at the lower part of FIG. 4 shows a lapse of the playback time and a transition of the size of data stored in the buffer 322.

It is appreciated from the buffer data size scaled at the vertical axis that the stop of the reading of the data from the disc with the occurrence of the jump leads to the start of the reduction in the data size, and the restart of the reading of the data from the disc due to the termination of the jump leads to the start of the increase in the buffer data size. If, with the buffer data size reaching zero, the output of the data from the decoding unit 323 is brought into a completion, the playback is suspended. Thus, it becomes necessary to set the buffer size required to prevent the buffer data size from reaching zero.

In an example shown in FIG. 4, when the inter-layer jump occurs in the course of the processing for an ECC block [SECC1] 332 contained in the data 331 read from the disc, an acquisition of the data from the disc is stopped, in which case, after the pickup control that follows the seek to an ECC block position of an ECC block [SECC2] 333 at the read start position in the read data 334 specified as jump destination data, the ECC block [SECC2] 333 is acquired, leading to the execution of the data playback through the processing of storing in the buffer and decoding.

In this case, the error correction and the decoding of the final ECC block [SECC1] 332 specified as jump source data and the error correction and the decoding of the first ECC block [SECC2] 333 specified as the jump destination data are required to be executed, in which case, however, all the data generated through these processing is not always outputted as the playback data.

In the worst case, an ineffective data processing time in which most of the processed data of these two ECC blocks is unavailable as the playback data is caused. The time required for the ineffective data processing is defined as the ECC block read overhead time [TOH] shown in FIG. 3(3).

The overhead time [TOH] in the worst case where most of the stored data composed of the ECC block data specified as the jump source data and the ECC block data specified as the jump destination data is unavailable for the playback is expressed as follows:

$$TOH=(2\times ECC\_size)/R_{UD}.$$

In the above expression, ECC_size denotes the data size of the individual ECC block, and $R_{UD}$ denotes the reading rate, which corresponds to the transfer rate of the data outputted from the buffer 322 to the decoding unit 323.

Assuming that the ECC block size is 64 KB, and the data transfer rate RUD is 54 Mbps, for instance, the overhead time [TOH] is calculated as follows:

$$TOH\leqq(2\times 64\times 1024\times 8)/54/10^6=20\text{ ms}.$$

That is, a maximum of the ECC block read overhead time [TOH] is determined as 20 ms.

A reduction speed of the buffer data size is dependent on the data recording rate [RTS]. The data recording rate [RTS] is applied to a rate that corresponds to data consumption involved in the data processing in the decoding unit 323.

The size of the playback data contained in the individual ECC block is not fixed because of a difference in compression rate, so that the size of the playback data, that is, the playback data time varies for each ECC block.

Figure 5:
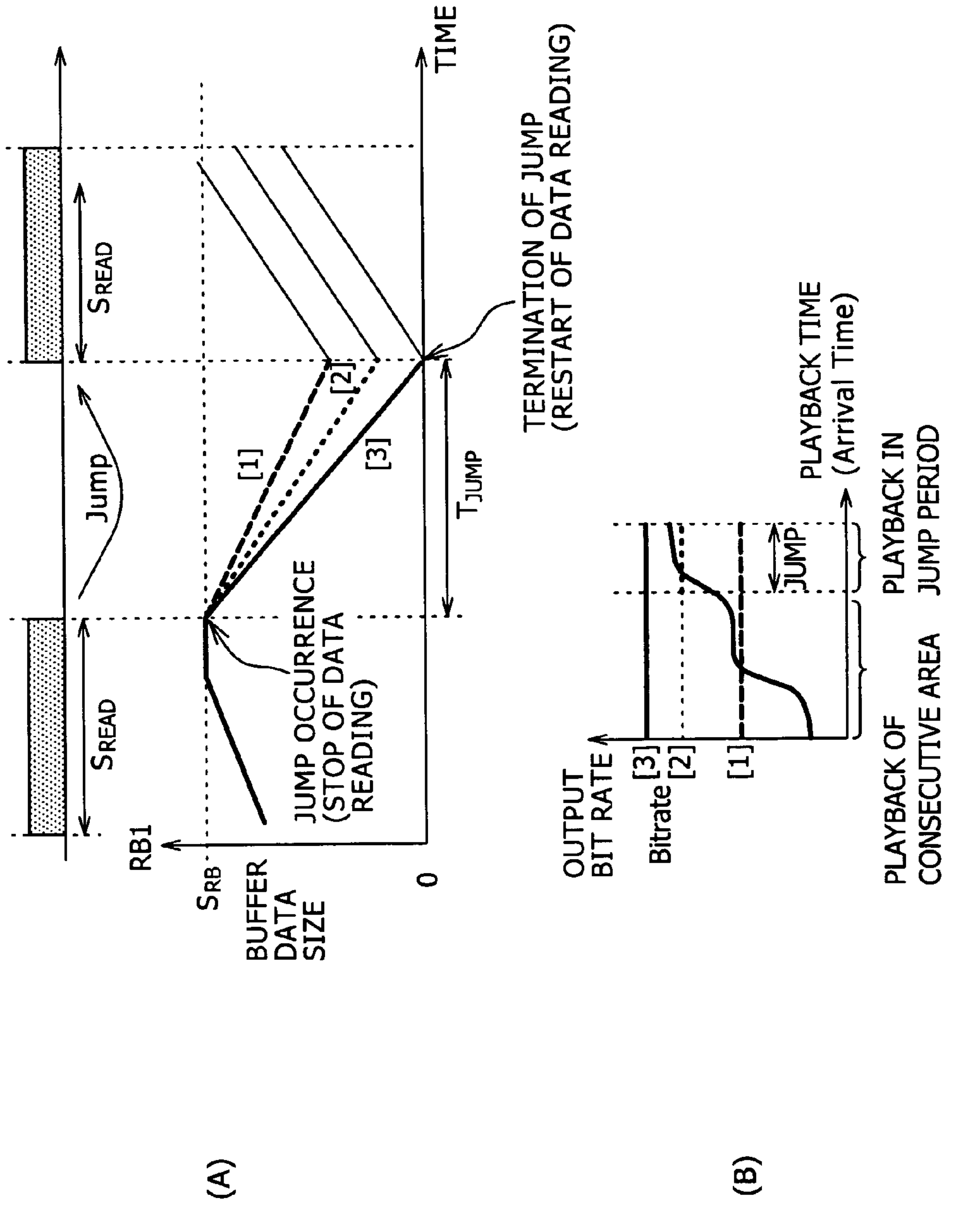
FIG. 5 shows views for explaining decrease in buffer data size in a case of occurrence of a jump.

Thus, the reduction speed of the buffer data size in the occurrence of the inter-layer jump does not always reach a fixed speed. The reduction in the buffer data size in the occurrence of the inter-layer jump will now be described with reference to FIG. 5.

FIG. 5(A) is a graph showing the lapse of the playback time and the transition of the size of the data stored in the buffer, like the graph shown in FIG. 4.

It is appreciated from the buffer data size scaled at the vertical axis that the stop of the reading of the data from the disc with the occurrence of the jump leads to the start of the reduction in the data size, and the restart of the reading of the data from the disc due to the termination of the jump leads to the start of the increase in the buffer data size. If, with the buffer data size reaching zero, the output of the data from the decoding unit is brought into the completion, the playback may be suspended. Thus, it becomes necessary to set the buffer size required to prevent the buffer data size from reaching zero.

To define a maximum buffer size [$S_{RB}$], it becomes necessary to assume the playback speed of the buffer data size in a jump period. However, the reduction speed of the buffer data size does not always reach the fixed speed as described above.

Thus, provided that some assumption is established to estimate the reduction speed of the buffer data size in the jump period, the buffer size [$S_{RB}$] is determined on the assumption.

A line [1] in the graph shown in FIG. 5(A) is assumed to be a line obtained by setting the reduction speed of the buffer data size in the jump period on the basis of an average rate available for the reading and the playback of the consecutive recording data area contained in the disc. A line [2] in the graph is assumed to be a line obtained by setting the reduction speed of the buffer data size in the jump period on the basis of an average rate that is obtained, after an extraction of the data actually involving the jump, instead of the consecutive recording data contained in the disc, through the calculation based on the playback rate of the extracted data. A line [3] in the graph is assumed to be a line obtained by being set on the basis of a maximum recording rate of the recording data that is set as the attribute information corresponding to the content recorded on the disc.

FIG. 5(B) is a graph showing an assumed rate value on each line [1], [2], and [3] shown in FIG. 5(A). The vertical axis shows a data output bit rate at the time of the playback, and the horizontal axis shows the playback time.

As shown in the FIG. 12B, the output bit rate has a relation of [1]<[2]<[3], and at the time of the playback of the consecutive recording data area in the disc, the playback is performed at the output bit rate approximately in alignment with the line [1], while at the time of the occurrence of the jump, the playback is performed at the output bit rate substantially in alignment with the line [2].

The application of the line [1], that is, the average playback rate of the consecutive recording area contained in the disc to the reduction speed of the buffer data size in the jump period causes the buffer data size to be reduced at a speed more than or equal to the assumed bit rate obtained by the application of the line [1], as shown in FIG. 5(B), and in the worst case, a loss of the buffer data is caused, leading to the possibility of the playback break. The application of the line [2], that is, the average rate obtained by the calculation based on the playback rate in the jump period provides an exact coincidence between the applied assumed bit rate and the actual reduction speed of the buffer data. Thus, the line [2] may be considered to be a theoretically optimum assumed bit rate, in which case, however, it is very difficult to practically specify the data positions corresponding to a beginning and an end points of the jump period, leading to difficulty in calculating the assumed bit rate used for the line [2].

Conversely, according to the assumption based on the line [3] shown in FIG. 5(A), that is, one based on the maximum recording rate set as the attribute information corresponding to the content recorded in the disc, there is the guarantee that the playback bit rate of the recording data in the disc does not exceed the bit rate of the line [3] shown in FIG. 5(B), and even at the time of the occurrence of the jump, the playback processing at the bit rate exceeding the bit rate of the line [3] does not take place. Further, the bit rate of the line [3] is assumed to be a set value obtained as the attribute information at the time of a creation of the content, so that the acquisition of the bit rate value may be attained easily with reference to the attribute information.

Thus, provided that the reduction in the buffer data size takes place at the time of the jump on the assumption that the playback at the bit rate corresponding to the maximum recording rate of the line [3] is performed, the maximum buffer size [$S_{RB}$] is calculated on the above assumption.

The Blu-ray Disc standards prescribe that the data is recorded in the disc as a 192-byte packet obtained by appending a 4-byte header to a 188-byte transport stream (TS) packet (TS packet recording rate is denoted as TS_recording_rate). When the data is assumed to be the 192-byte packet, the maximum recording rate [RTS] is expressed as follows:

$$RTS=(TS\_\text{recording\_rate})\times 192/188.$$

In the playback of the disc that completes the data recording in conformity with the Blu-ray Disc standards, the playback at the rate lower than or equal to the maximum recording rate [RTS] calculated based on the above TS packet size is supposed to be performed. Thus, the buffer size [SRB] required to prevent the buffer data from reaching zero in the course of the jump at the time when performing the playback involving the inter-layer jump is calculated as follows:

$$SRB=RTS\times T\text{jump}.$$

Next, a setting example that assures playback causing no data break to the inter-layer jump will be described with reference to FIG. 6. When establishing the prescription of the data recording to the disc, it becomes necessary to determine an allowable inter-layer jump mode, that is, the jump range effective in preventing the occurrence of the data break, thereby performing the content recording in the mode that permits the jump to occur only within the determined range.

Figure 6:
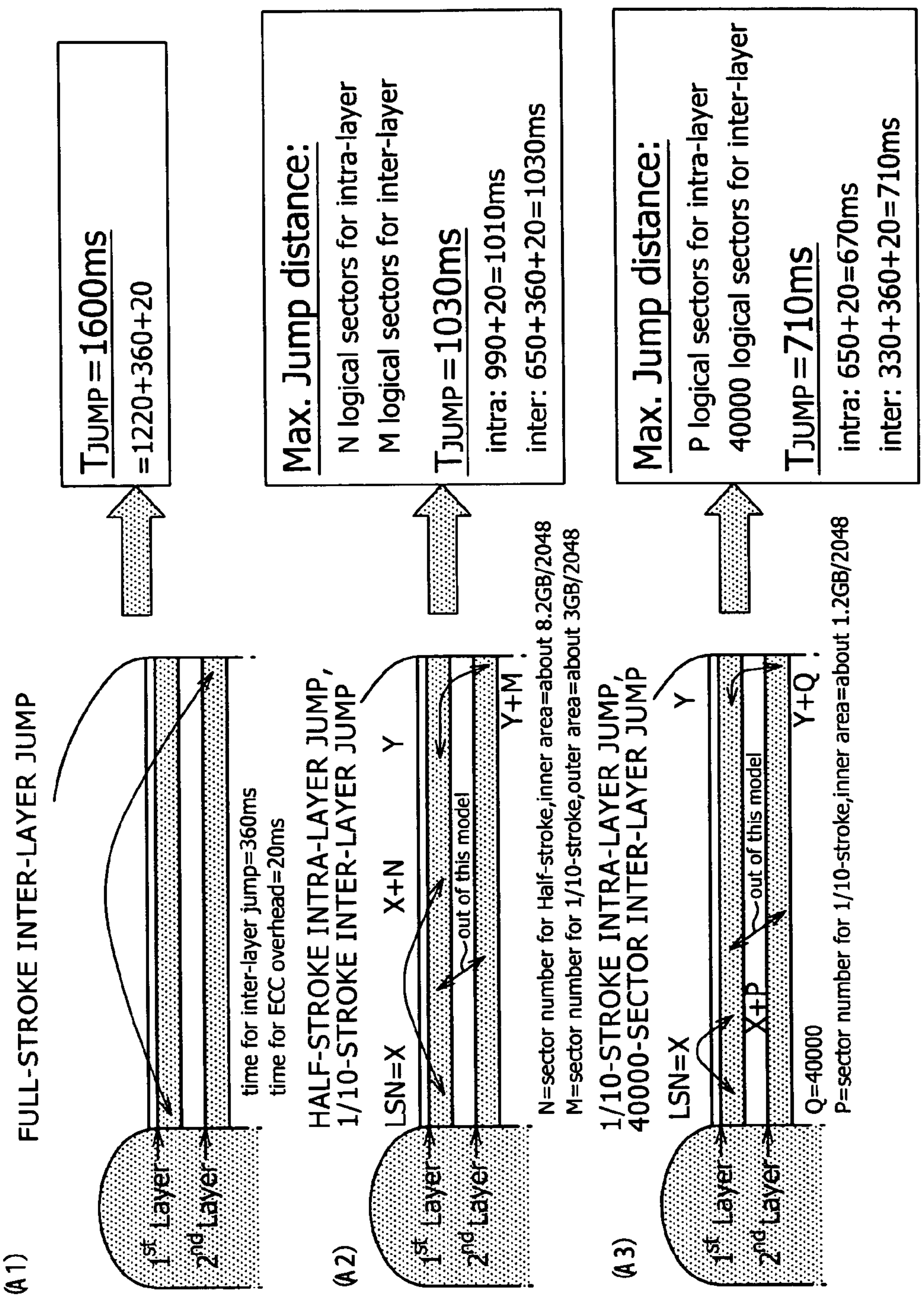
FIG. 6 shows views for explaining setting examples of a plurality of jump models (A1)-(A3) guaranteeing playback without data break for the inter-layer jump.

FIG. 6 shows examples of the setting of the allowable inter-layer jump and a calculation example of the total jump time [TJUMP] in the inter-layer jump processing. As described above, the total jump time is obtained as a sum of:

the time [TACC] corresponding to the seek time of the pickup, the adjustment time [TIL] of the pickup, and the overhead time [TOH] attributed to the ECC block processing, that is, TJUMP=TACC+TIL+TOH.

FIG. 6(A1) shows an example of a case where a full-stroke inter-layer jump in the range from the innermost side of the first layer to the outermost side of the second layer is allowed, and the total jump time [TJUMP] in this case is given as follows:

$$TJUMP=1220(TACC)+330(TIL)+20(TOH)=1600\text{ ms.}$$

It is noted that each of the time [TACC] corresponding to the seek time of the pickup, the adjustment time [TIL] of the pickup, and the overhead time [TOH] attributed to the ECC block processing is supposed to be based on the embodiment having been described with reference to FIG. 3.

The determination of the allocation conditions of the recording data to the disc based on this case makes it possible to guarantee the consecutive supply of the data, even if the jump takes place between the arbitrary addresses within the recording medium. However, conversely, the jump time is supposed to be set larger than (A2), (A3) described later, leading to the increase in the buffer size required to guarantee the consecutive supply of the data as described with reference to FIG. 7.

FIG. 6(A2) shows an example of a case where the half-stroke intra-layer jump and a 1/10-stroke inter-layer jump are established as the allowable maximum jump distance, and the total jump time [TJUMP] in this case is given as follows:

(1) Half-stroke intra-layer jump $$TJUMP=990(TACC)+0(TIL)+20(TOH)=1010\text{ ms,}$$

and (2) 1/10-stroke inter-layer jump $$TJUMP=650(TACC)+360(TIL)+20(TOH)=1030\text{ ms.}$$

The maximum jump time is determined as 1030 ms.

This model is required to determine the data allocation conditions, provided that the jump distance is limited to the range of about [$8.2\times2^{30}/2048$] sectors as to the intra-layer jump, and the range of about [$3\times2^{30}/2048$] sectors as to the inter-layer jump, in which case, however, the buffer size required to guarantee the consecutive supply of the data is made smaller than that of the model of (A1), as described with reference to FIG. 7.

FIG. 6(A3) shows an example of a case where the 1/10-stroke intra-layer jump and a 40000-sector inter-layer jump are established as the allowable maximum jump distance, and the total jump time [TJUMP] in this case is given as follows:

(1) 1/10-stroke intra-layer jump $$TJUMP=650(TACC)+0(TIL)+20(TOH)=670\text{ ms,}$$

and (2) 40000-sector inter-layer jump $$TJUMP=330(TACC)+360(TIL)+20(TOH)=710\text{ ms.}$$

The maximum jump time is determined as 710 ms.

This model is required to determine the data allocation conditions, provided that the jump distance is limited to the range of about [$1.2\times2^{30}/2048$] sectors as to the intra-layer jump, and the range of 40000 sectors as to the inter-layer jump, in which case, however, the buffer size required to guarantee the consecutive supply of the data is made smaller than that of the models of (A1), (A2), as described with reference to FIG. 7.

Figure 7:
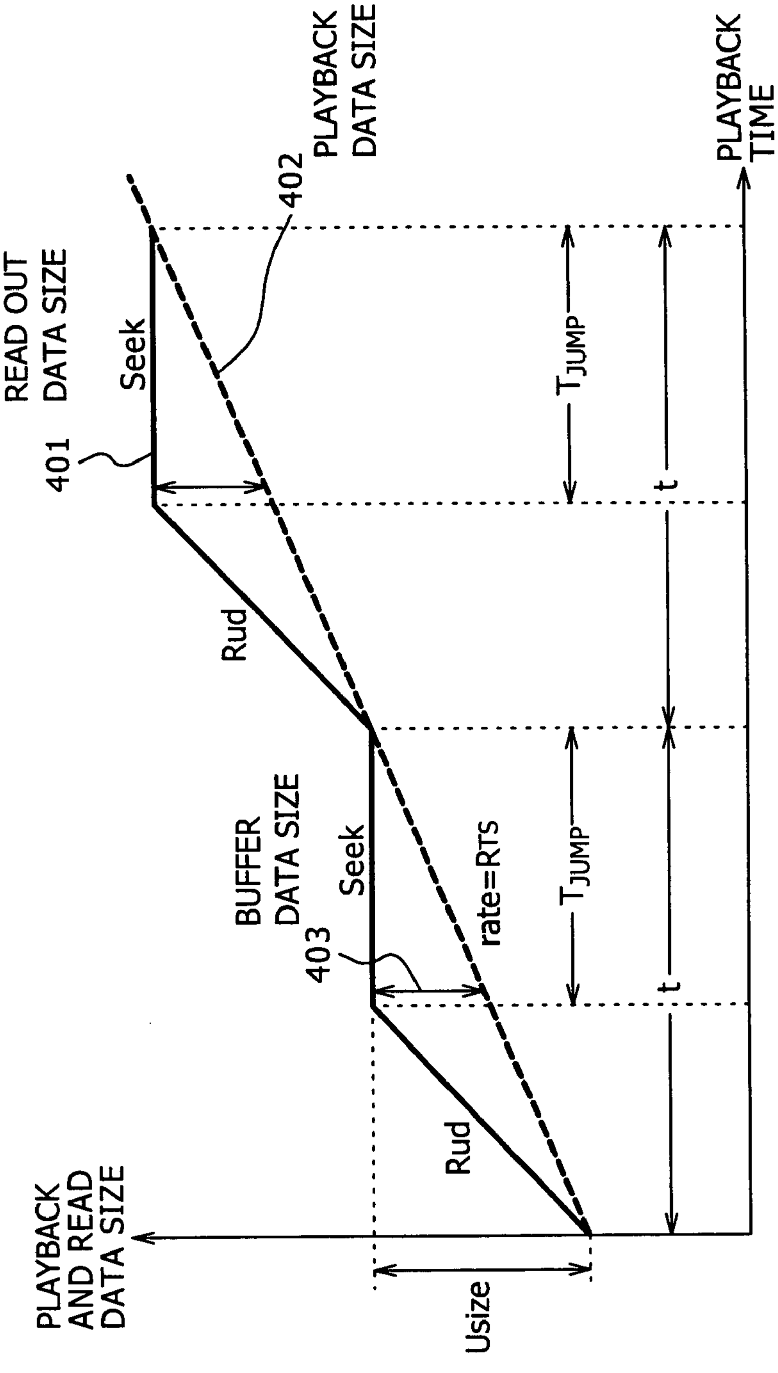
FIG. 7 is a view for explaining a method of determining consecutive data allocation conditions suited to a value of a data recording rate with respect to the jump time.

FIG. 7 is a view for explaining a method of determining the consecutive data allocation conditions suited to the value of the data recording rate with respect to the jump time. An allowable minimum playback time [t] corresponding to a minimum data unit to be allocated consecutively in the disc is calculated based on the total jump time [TJUMP], the rate [Rud] of the reading of the data from the disc in the drive, and the data recording rate [RTS]. A value calculated by multiplying the data read rate [Rud] by the allowable minimum playback time [t] of the data to be allocated consecutively is obtained as a consecutive data allocation size [Usize]. That is:

$$Usize=Rud\times t.$$

Details of the processing of calculating the consecutive data allocation size [Usize] will be described.

In FIG. 7, the horizontal axis shows the playback time, and the vertical axis shows a size of the data read from the disc and a size of the playback data. A solid line indicates the transition of a read out data size 401 from the disc with the lapse of the playback time, and a dotted line indicates the transition of a playback data size 402 with the lapse of the playback time.

A difference between the read out data size 401 and the playback data size 402 corresponds to a buffer data size 403. The playback data size 402 is supposed to allow the playback of the data of a fixed size with the lapse of the playback time, specifically, the playback data size 402 increases in proportion to the time as shown in the figure.

Conversely, with regard to the read out data size 401, when the jump occurs, the reading of the data from the disc is stopped so that the increase of the read out data size 401 is stopped, while for the processing of reading the consecutive data storage area without involving the jump, the reading of the data is performed at the fixed read out rate, that is, at the rate of 54 Mbps, for instance.

The difference between the read out data size 401 and the playback data size 402 shown in FIG. 7 is assumed to be the buffer data size 403, in which case, however, if there is provided the setting that guarantees that the buffer data size 403 is not decreased to zero or below even in the occurrence of the jump processing, the seamless playback is made possible without causing any playback break in the jump playback.

In a case where the read out data size 401 and the playback data size 402 are fixed, the buffer data size 403 specified as the difference between the read out data size 401 and the playback data size 402 may be increased only by increasing the value of [Usize] shown in FIG. 7.

The [Usize] shown in FIG. 7 corresponds to the size of the data applied to the consecutive reading in the disc without involving the jump processing. This data size is called the consecutive data allocation size [Usize].

The allowable minimum playback time [t] of the consecutively allocated data in the disc is calculated based on the total jump time [TJUMP], the rate [Rud] of the reading of the data from the disc in the drive, and the data recording rate [RTS] according to the following expression. That is:

$$t=Tjump\times Rud/(Rud-RTS).$$

If the data has been recorded on the disc as the data block larger than or equal to the allowable minimum playback time [t] of the consecutive data, the buffer data size is not 0 or below at the time of the occurrence of the jump, resulting in the guarantee of the consecutive playback.

The value calculated by multiplying the data recording rate [RTS] by the allowable minimum playback time [t] of the consecutive data as having been calculated according to the above expression is obtained as the consecutive data allocation size [Usize]. That is:

$$Usize=RTS\times t.$$

If the data has been recorded in the disc as the data block larger than or equal to the consecutive data allocation size [Usize], the buffer data would not reach 0 or below at the time of the occurrence of the jump, resulting in the guarantee of the consecutive playback.

One embodiment of the calculation of the consecutive data allocation size [Usize] is specifically described. The total jump time [TJUMP], the rate [Rud] of the reading of the data from the disc in the drive, and the data recording rate [RTS] are assumed to take the following values:

TJUMP [msec]: Intra-layer access time *TACC*+Inter-layer jump time *TIL*+Overhead *TOH* attributed to the ECC block boundary Rud [$\times 10^6$ bps]: Read rate=54 Mbps RTS [$\times 10^6$ bps]: Maximum recording rate (TS_recording_rate×192/188)

Then, the calculation of t[msec] specified as the allowable minimum playback time of the consecutive data and Usize [$\times 2^{20}$ Bytes] specified as the consecutive data allocation size is performed.

The allowable minimum playback time [t] of the consecutive data and the consecutive data allocation size [Usize] are calculated as follows:

$$t(\text{msec})=TJUMP\times Rud/(Rud-RTS),$$

$$Usize(\text{Byte})=t/1000\times RTS/8.$$

The calculation of the consecutive data allocation size [Usize] through the application of the above expression to the model shown in FIG. 6(A2), that is, the case where TJUMP=1030 ms, results in as follows:

$$Usize(\text{Byte})=20.6\text{ Mbytes},$$

provided that RTS=(TS_recording_rate×192/188)=40 Mbps.

That is, in the case of the model shown in FIG. 6(A2), that is, when TJUMP=1030 ms is determined as the maximum jump time, the recording of the data to the disc needs to satisfy the following condition:

Consecutive data allocation size[Usize]=20.6 Mbytes.

That is, the data recording through the setting of the consecutive data allocation area of 20.6 Mbytes or above is required.

As described above, the allowable minimum playback time [t] of the consecutive data and the consecutive data allocation size [Usize] are calculated as follows:

$$t(\text{msec})=TJUMP\times Rud/(Rud-RTS),\text{ and}$$

$$Usize(\text{Byte})=t/1000\times RTS/8.$$

Thus, when the maximum jump time [TJUMP] is set largely, both the allowable minimum playback time [t] and the consecutive data allocation size [Usize] need to be set largely, resulting in the need to largely set the buffer size.

FIG. 8 is a table that lists, with reference to each of the jump models (A1) to (A3) having been described with reference to FIG. 6, the data allocation conditions (the minimum of the consecutive data allocation size) corresponding to values of the data recording rate (RTS) and the buffer size (SRB) required to guarantee the consecutive supply of the data using the calculation method having been described with reference to FIG. 7.

As described with reference to FIG. 6, (A1) shows the case where the full-stroke inter-layer jump in the range from the innermost side of the first layer to the outermost side of the second layer is allowed, and the total jump time [TJUMP] in this case is given as follows:

$$TJUMP=1220(TACC)+360(TIL)+20(TOH)=1600\text{ ms}.$$

In this case, the required buffer size [SRB] is assumed to be 9.36 Mbytes, and the data allocation conditions (the minimum of the consecutive data allocation size) corresponding to each value of the data recording rate (RTS) are given as follows:

$RTS$=5×188/192 Mbps→Consecutive data allocation size[$U$size]=1.1 Mbytes $RTS$=10×188/192 Mbps→Consecutive data allocation size[$U$size]=2.4 Mbytes $RTS$=20×188/192 Mbps→Consecutive data allocation size[$U$size]=6.3 Mbytes $RTS$=30×188/192 Mbps→Consecutive data allocation size[$U$size]=13.6 Mbytes $RTS$=40×188/192 Mbps→Consecutive data allocation size[$U$size]=32.0 Mbytes $RTS$=48×188/192 Mbps→Consecutive data allocation size[$U$size]=101.5 Mbytes.

The example of (A2) shows a case where the half-stroke intra-layer jump and a 1/10-stroke inter-layer jump are established as the allowable maximum jump distance, and the total jump time [TJUMP] in this case is given as follows:

(1) Half-stroke intra-layer jump $TJUMP$=990($TACC$)+0($TIL$)+20($TOH$)=1010 ms, and (2) 1/10-stroke inter-layer jump $TJUMP$=650($TACC$)+360($TIL$)+20($TOH$)=1030 ms, and the maximum jump time is determined as 1030 ms.

In this case, the required buffer size [SRB] is assumed to be 6.02 Mbytes, and the data allocation conditions (the minimum of the consecutive data allocation size) corresponding to each value of the data recording rate (RTS) are given as follows:

$RTS$=5×188/192 Mbps→Consecutive data allocation size[$U$size]=0.7 Mbytes $RTS$=10×188/192 Mbps→Consecutive data allocation size[$U$size]=1.6 Mbytes $RTS$=20×188/192 Mbps→Consecutive data allocation size[$U$size]=4.1 Mbytes $RTS$=30×188/192 Mbps→Consecutive data allocation size[$U$size]=8.7 Mbytes $RTS$=40×188/192 Mbps→Consecutive data allocation size[$U$size]=20.6 Mbytes $RTS$=48×188/192 Mbps→Consecutive data allocation size[$U$size]=65.3 Mbytes.

The example of (A3) shows a case where the 1/10-stroke intra-layer jump and a 40000-sector inter-layer jump are established as the allowable maximum jump distance, and the total jump time [TJUMP] in this case is given as follows:

(1) 1/10-stroke intra-layer jump $TJUMP$=650($TACC$)+0($TIL$)+20($TOH$)=670 ms, and (2) 40000-sector inter-layer jump $TJUMP$=330($TACC$)+330($TIL$)+20($TOH$)=710 ms, and the maximum jump time is determined as 710 ms.

In this case, the required buffer size [SRB] is assumed to be 4.15 Mbytes, and the data allocation conditions (the minimum of the consecutive data allocation size) corresponding to each value of the data recording rate (RTS) are given as follows:

$RTS$=5×188/192 Mbps→Consecutive data allocation size[$U$size]=0.5 Mbytes $RTS$=10×188/192 Mbps→Consecutive data allocation size[$U$size]=1.1 Mbytes $RTS$=20×188/192 Mbps→Consecutive data allocation size[$U$size]=2.8 Mbytes $RTS$=30×188/192 Mbps→Consecutive data allocation size[$U$size]=6.0 Mbytes $RTS$=40×188/192 Mbps→Consecutive data allocation size[$U$size]=14.2 Mbytes $RTS$=48×188/192 Mbps→Consecutive data allocation size[$U$size]=45.1 Mbytes.

As described above, both the buffer size and the minimum of the consecutive data allocation size may be reduced as the jump time reduces in the order of (A1)→(A2)→(A3). The advantage of reducing the buffer size leads to the effect on the cost reduction of the playback apparatus. An advantage of reducing the minimum value of the consecutive data allocation size enables a seamless connection in small allocation units and small playback units even when the AV streams of the same rate are given, leading to the effect of increasing the degree of editorial flexibility.

Figure 9:
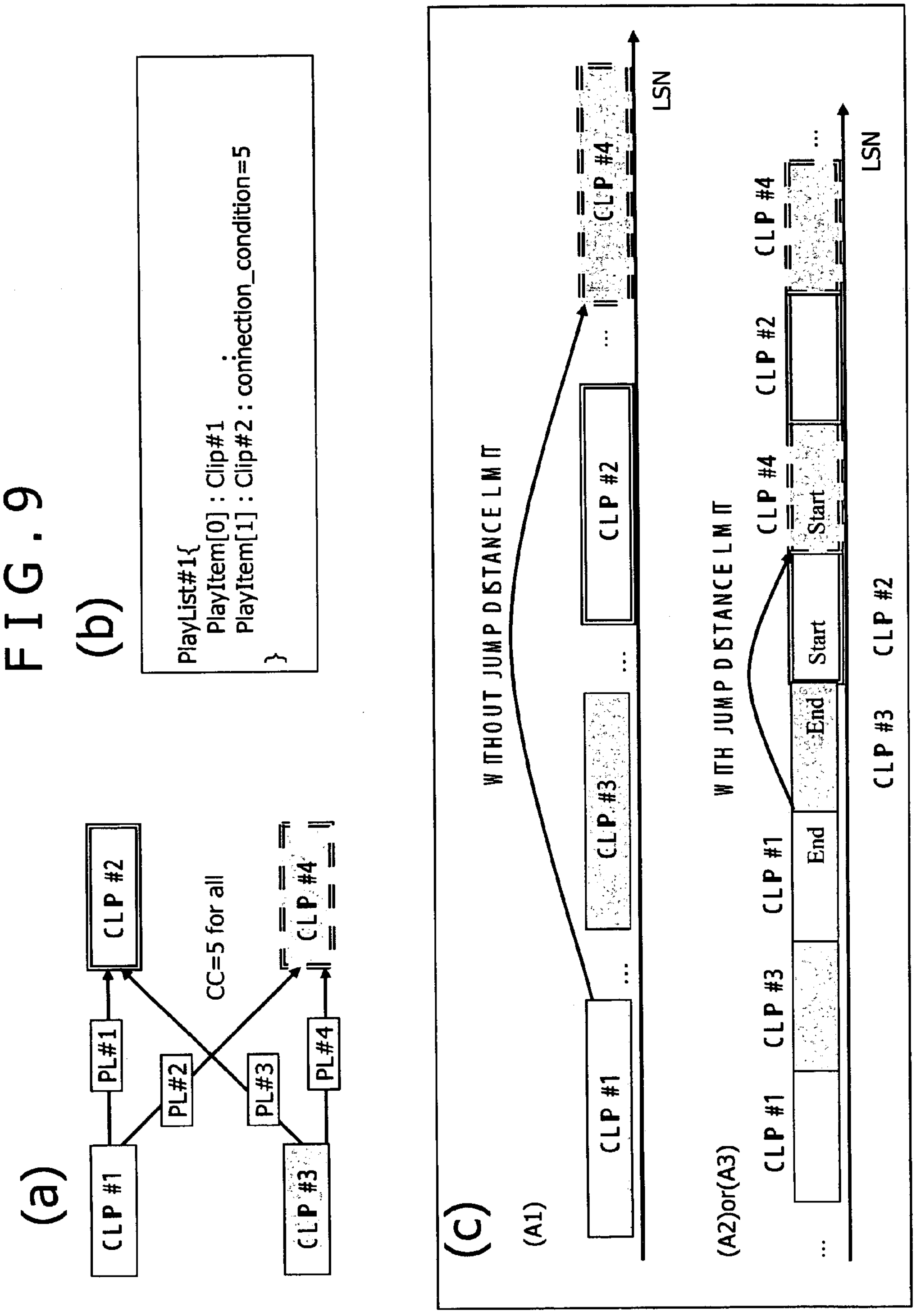
FIG. 9 shows views for illustrating a data allocation method in a case of connecting a plurality of clips (Clip) seamlessly in each of the jump models (A1)-(A3) explained with reference to FIG. 6.

FIG. 9 shows views for illustrating a data allocation method in a case of connecting a plurality of clips (Clips) seamlessly in each of the jump models (A1)-(A3) explained with reference to FIG. 6.

A clip (Clip) corresponds to AV stream data corresponding to the clip information of the content data file described with reference to FIG. 2 in the above. In other words, playback of content corresponding to a Clip designated through a PlayList is performed.

As described with reference to FIG. 2, content of a Blu-ray Disc has a four-hierarchy configuration of Title, Playback Program, PlayList and Clip. The playback program is selected through the Title designated by a user and playback content assigned in the PlayList selected through the playback program is selected in accordance with the clip information to be reproduced.

A jump processing occurs during movement between clips. A playback mode of the plurality of clips (Clips) shown in FIG. 9($a$) is a view showing a transfer processing example between Clips in a playback processing according to various PlayLists #1-#4 in a case where there exist four Clips #1-#4.

PlayLists #1-#4 have program configuration as shown in FIG. 9($b$), for example, and are configured to set a prescribed sequence of the clips as a playback target. In a case of performing playback based on PlayList #1 shown in FIG. 9($b$), for example, playback of Clip #2 is supposed to follow the content playback of Clip #1. In this case, when the clips in the range of Clip #1 to Clip #2 are not contained in the consecutive area of the disc, the jump processing occurs.

Although it is preferable to record data of the same clip as consecutive areas, in a case where various jump processes as shown in FIG. 9($a$) are performed, it is necessary to perform the data recording through a segmentation of each clip data such that the jump distance is limited to less than the allowable maximum jump distance.

In each of the jump models (A1)-(A3) having been described with reference to FIG. 6, the data allocation assuring seamless playback in a case of occurrence of a jump between the plurality of clips (Clips) shown in FIG. 9(*a*) is set as shown in FIG. 9(*c*).

The jump model (A1) allows a jump of full-stroke. Accordingly, in the jump model (A1), since the jump between arbitrary addresses on the recording medium is allowed, it is necessary for each Clip #1-#4 to only satisfy a requirement of consecutively allocating data in a size larger than the minimum value of the consecutive allocation size of data described with reference to FIG. 7, FIG. 8 in the above, that is, the consecutive data allocation size [Usize]. Seamless playback having no data break is made possible even in a case of occurrence of a jump between clips if data playback is performed in the size larger than the consecutive data allocation size [Usize].

On the other hand, a maximum jump distances within a layer/between layers is limited for each case of the jump models (A2), (A3). In the jump model (A2), the maximum jump time is 1030 ms, and in the jump model (A3), the maximum jump time is 710 ms.

In this case, it is necessary not only to satisfy a requirement of consecutively allocating data in a size larger than the minimum value of the consecutive allocation size of data described with reference to FIG. 7, FIG. 8 in the above, that is, the consecutive data allocation size [Usize] but also to perform data allocation making the jump between the clips shown in FIG. 9(*a*) executable within the aforementioned maximum jump time.

Accordingly, it is necessary to perform data recording by dividing data constructing each clip, interleaving and recording in the middle of each clip, as in Clips #1 and #3 and Clips #2 and #4, and by setting the jump distance to be a connection point between the clip to be within the maximum jump time 1030 ms for the jump model (A2) and the maximum jump time 710 ms for the jump model (A3), as shown in FIG. 9(*c*).

Figure 10:
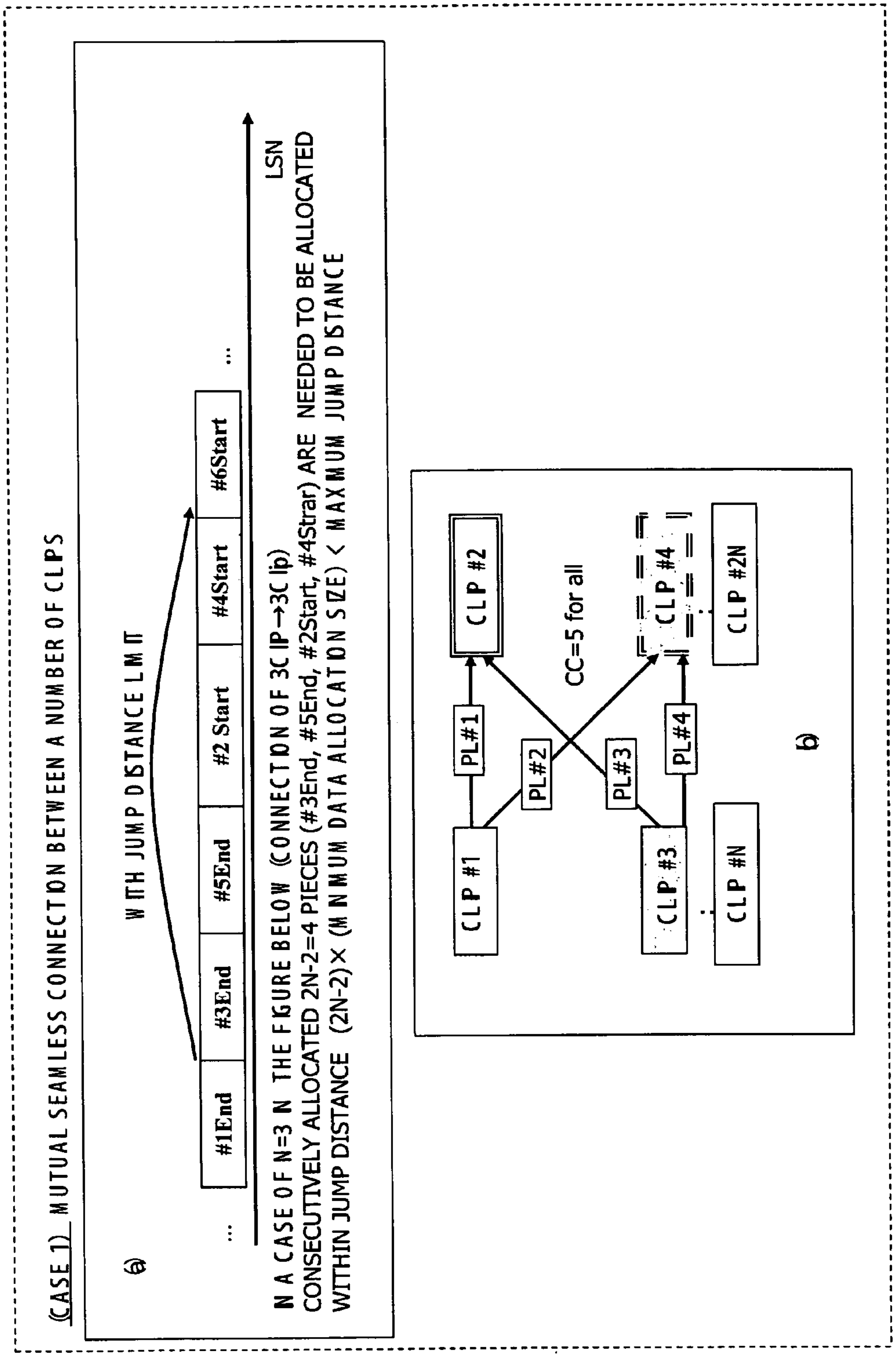
FIG. 10 shows views explaining a problem occurring in a case where the number of clips is increased, and a content producing method addressing the problem.

FIG. 10 shows views explaining a problem occurring in a case of the number of clips being increased in FIG. 9 and a content producing method addressing the problem.

FIG. 10 (*a*) shows an example of content storage configuration requiring seamless connection from three Clips #1-#3 to other three Clips #4-#6 following thereto.

In this way, in a case of the number if clips to connect is increased, even if such interleave as described with reference to FIG. 9 in the above, there may arise a case where both of these two conditions, that is, the condition of "consecutively allocating data in a size larger than the minimum value of the consecutive allocation size of data, that is, the consecutive data allocation size [Usize]" and the condition of "setting the jump distance at the time of seamless connection within the limit" cannot be accomplished.

For example, in a case of the number of connecting clips being N-clips→N-clips, in the example shown in FIG. 10(*a*), N=3 (3-clips→3-clips), however, in this case, it is necessary that 2N−2=4 pieces of consecutive allocation blocks, that is, an end point (END) of Clip #3,
an end point (END) of Clip #5,
a start point (START) of Clip #2, and
a start point (START) of Clip #3, are mutually allocated within a jump distance that they are able to jump within the maximum jump time set in each jump model. That is, it is necessary to satisfy:

$$(2N-2)\times(\text{consecutive data allocation size}[U\text{size}]) < \text{maximum jump distance}.$$

However, regarding the above expression, the requirement cannot be satisfied if the number of connecting clips (N) is increased.

Consequently, content production is performed after defining: the condition of "consecutively arranging data in a size larger than the minimum value of the consecutive allocation size of data, that is, the consecutive data allocation size [Usize]", the condition of "setting the jump distance at the time of seamless connection within the limit", and a condition of "calculating the maximum value Nmax of the number of connecting clips, for satisfying both of these two conditions, and setting clip configuration of the content to be stored in the disc to have the number of connecting clips of the maximum value Nmax or lower".

As shown in FIG. 10(*b*), assuming that the number of connecting clips is N-clips→N-clips, the maximum value Nmax of the number of connecting clips can be obtained with regard to the value of TS_recording_rate in each of the jump models (A2) and (A3) described with reference to FIG. 6.

For example, in a case of TS_recording_rate=48 Mbps, the jump model (A2) is a model setting:

(1) Half-stroke intra-layer jump $$TJUMP=990(TACC)+0(TIL)+20(TOH)=1010 \text{ ms},$$

and (2) 1/10-stroke inter-layer jump $$TJUMP=650(TACC)+360(TIL)+20(TOH)=1030 \text{ ms},$$

as the maximum allowable jump time, respectively. In this case, the maximum value Nmax of the number of connecting clips can be set to have:

Nmax=64 for the intra-layer jump, and
Nmax=24 for the inter-layer jump.

Performing data recording on a disc satisfying the aforementioned conditions, that is, producing content having the connecting clips in the number of the maximum value Nmax or lower, consecutively allocating data in a size larger than the minimum value of the consecutive allocation size of data, that is, the consecutive data allocation size [Usize] and setting the jump distance at the time of seamless connection within the limit enables a seamless content playback processing with no playback break even in a case of performing a jump between clips.

In addition, in a case of TS_recording_rate=48 Mbps, the jump model (A3) is a model setting:

(1) 1/10-stroke intra-layer jump $$TJUMP=650(TACC)+0(TIL)+20(TOH)=670 \text{ ms},$$

and (2) 40000-sector inter-layer jump $$TJUMP=330(TACC)+360(TIL)+20(TOH)=710 \text{ ms},$$

as the maximum allowable jump time. In this case, the maximum value Nmax of the number of connecting clips can be set to have:

Nmax=14 for the intra-layer jump, and
Nmax=1 for the inter-layer jump.

Performing data recording on a disc satisfying the aforementioned requirements, that is, producing content having the connecting clips in the number of the maximum value Nmax or lower, consecutively allocating data in a size larger than the minimum value of the consecutive allocation size of data, that is, the consecutive data allocation size [Usize] and setting the jump distance at the time of seamless connection within the limit enables a seamless content playback processing with no playback break even in a case of performing a jump between clips.

In a case of producing content data and determining data allocation on a recording medium in accordance with authoring software as a content producing program, content generation guaranteeing seamless playback at the time of a jump between clips, data recording on a disc and content playback from the disc are realized by implementing prohibition of a case in which data allocation is not possible depending on the above-described maximum value of N, in specific, generating an authoring software program in which the maximum value Nmax of the connecting clips is set as a parameter and producing content to which the authoring software program is applied.

Figure 11:
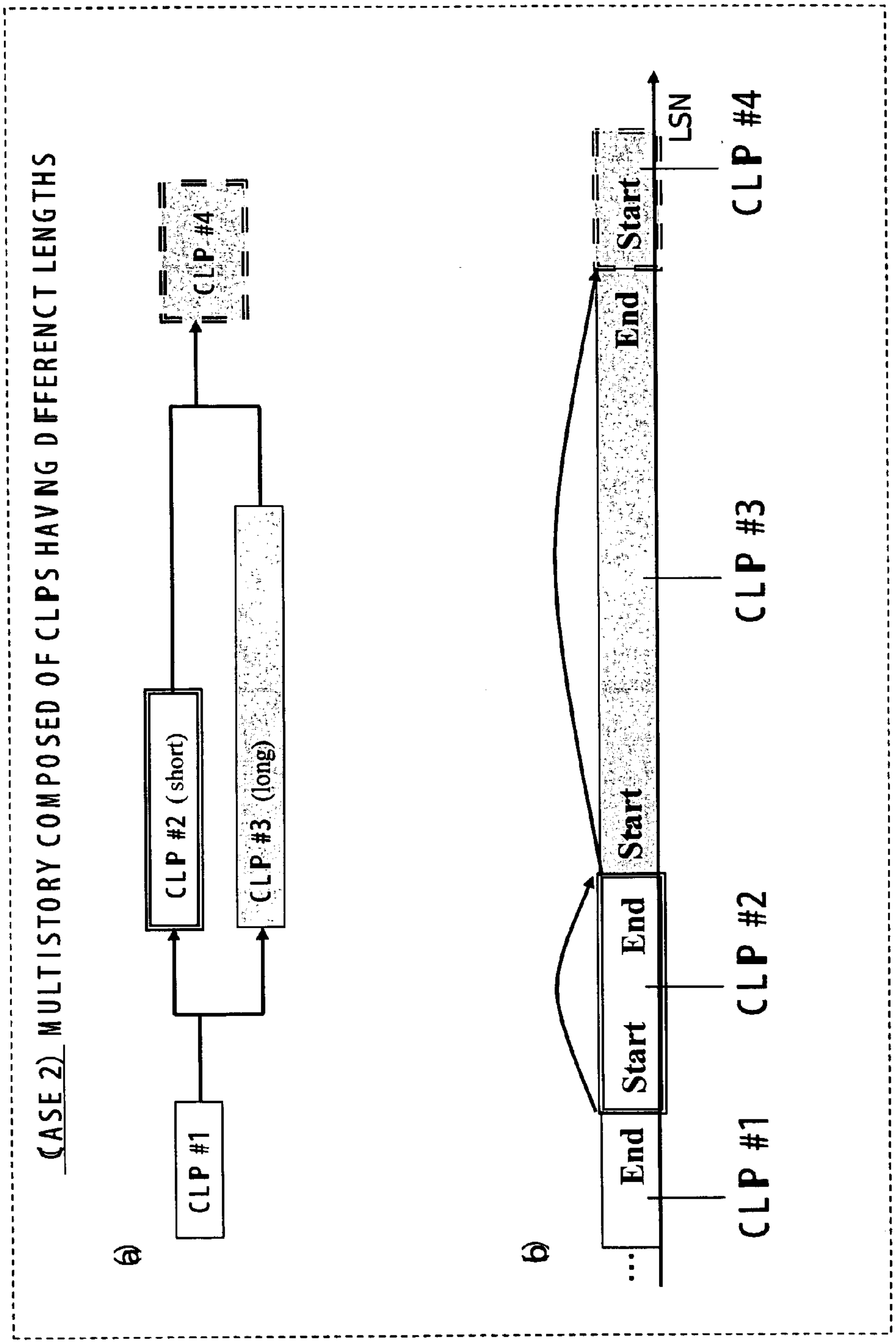
FIG. 11 shows views explaining a problem occurring in a case where the content to be stored in the disc is multi-story content having a plurality of clips with different lengths as its structural data, and a content producing method addressing to the problem.

FIG. 11 shows views explaining a problem occurring in a case where the content to be stored in the disc is multi-story content having a plurality of clips with different lengths as its structural data, and a content producing method addressing the problem.

As shown in FIG. 11 (*a*), multi-story content selecting any one of Clip #2 and Clip #3 having significantly different lengths subsequent to playback of Clip #1 is assumed.

In a case of producing such content, interleave of the clip described with reference to FIG. 9 in the above cannot be carried out and there may possibly arise a case of exceeding the limit in the jump distance in connection to Clip #4, as a result.

That is, as shown in FIG. 11(*b*), it is necessary to satisfy these two conditions:

(A) an end point (END) of Clip #1 is required to be allocated within a distance in which a jump to both a start point (START) of Clip #2 and a start point (START) of Clip #3 is possible within an allowable jump time, and, further, (B) both of an end point (END) of Clip #2 and an end point (END) of Clip #3 are allocated within a distance in which a jump to a start point (START) of Clip #4 is possible within an allowable jump time.

However, there may be a case where if the condition (A) is satisfied but the condition (B) cannot be satisfied, and, as a result, either a connection distance from Clip #2 to Clip #4 or a connection distance from Clip #3 to Clip #4 becomes larger than the distance in which a jump within the allowable jump time is possible. In such a case, the seamless playback cannot be assured.

In order to avoid such situation, in a case of producing content data and determining data allocation on a recording medium in accordance with authoring software as a content producing program, a parameter having the relation between the length of clip used in the multi-story content and data size as a limit value, content production based on the parameter is performed so as not to have a case in which allocation is not possible.

The content production in accordance with authoring software setting the limitation parameter makes it possible to set a possible connection distance between clips to a distance in which a jump is possible within the allowable jump time set in each jump model so that a seamless content playback processing with no playback break even in a case of performing a jump between clips.

Figure 12:
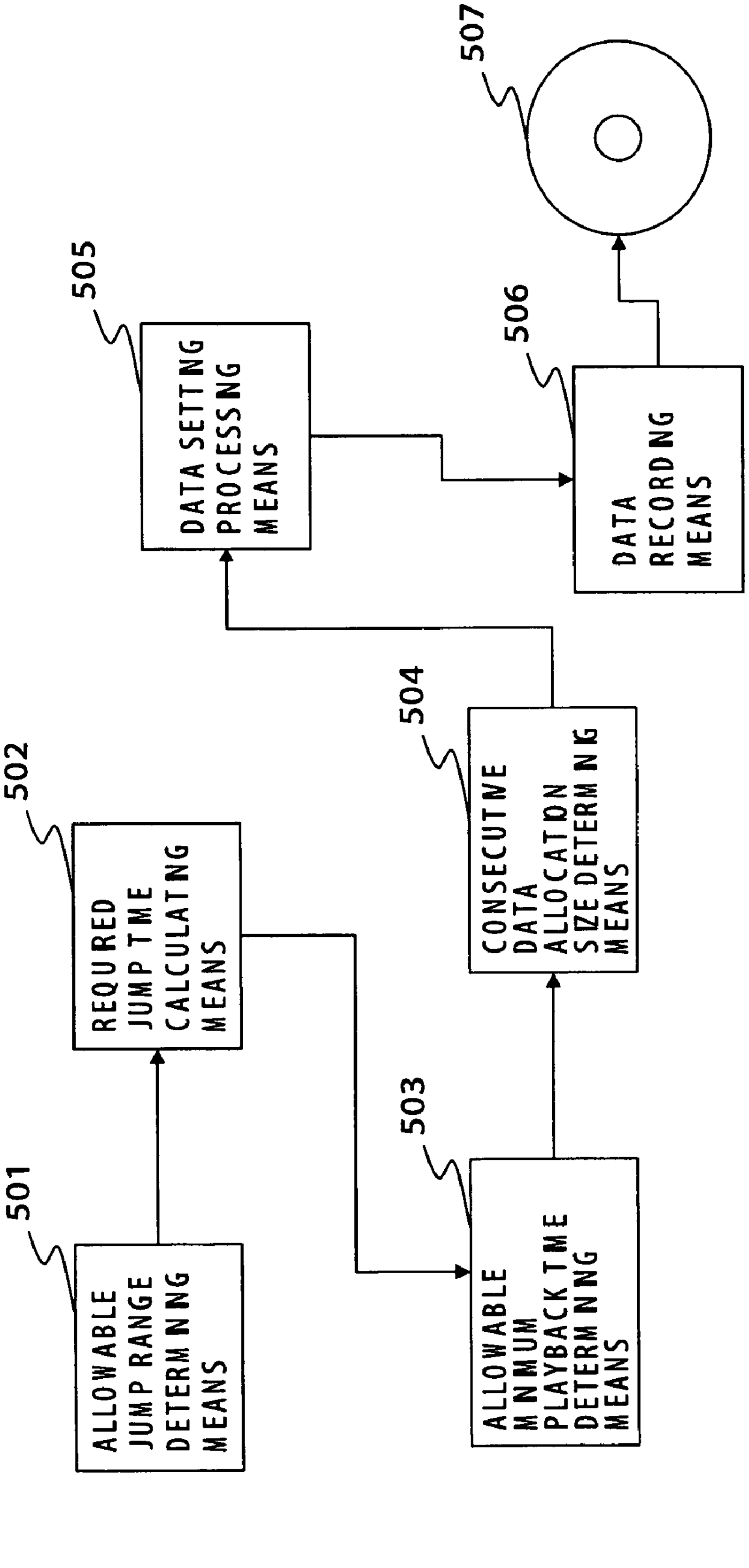
FIG. 12 is a view for explaining a structural example of a data processing apparatus for generating record data for an information recording medium.

A configuration of a data processing apparatus that performs the above data processing is now described with reference to FIG. 12. The data processing apparatus of the present invention is a data processing apparatus that determines allocation of record data on an information recording medium having a plurality of recording layers, and has, as shown in FIG. 12, allowable jump range determining means 501, required jump time calculating means 502, allowable minimum playback time determining means 503, consecutive data allocation size determining means 504, data setting processing means 505 and data recording means 506, and records data having a determined data configuration on an information recording medium 507.

The allowable jump range determining means 501 performs the processing of determining the allowable range of each of the intra-layer jump and the inter-layer jump that are performed in the playback processing for the information recording medium. For example, it carries out a processing of setting one of the jump models having been described with reference to FIG. 6.

The required jump time determining means 502 calculates the time required for each of the intra-layer jump and the inter-layer jump on the basis of allowable jump range information determined by the allowable jump range determining means 501.

The required jump time calculating means 502 calculates, as the required jump time for the intra-layer jump, a sum of the seek time of the pickup and the overhead time involved in the processing for the read data unit block of the information recording medium, and as the required jump time for the inter-layer jump, a sum of the seek time of the pickup, the pickup adjustment time involved in the inter-layer seek and the overhead time involved in the processing for the read data unit block of the information recording medium.

The allowable minimum playback time determining means 503 has a structure for calculating the allowable minimum playback time [t] on the basis of a jump time [TJUMP], a data read out rate [Rud] from a disc in a drive and a data recording rate [RTS] in accordance with the following equation:

$$t=TJUMP\times Rud/(Rud-RTS).$$

The consecutive data allocation size determining means 504 has a structure for determining the allowable minimum consecutive data size of the data to be stored in the information recording medium on the basis of the allowable minimum playback time [t] calculated by the aforementioned equation in accordance with the following equation:

$$Usize=t\times RTS.$$

The data setting processing means 505 identifies jump origin data and jump destination data that can be generated in the playback processing of the stored data in the information recording medium and setting a distance between the jump origin data and the jump destination data within the allowable jump range determined in the allowable jump range determining means 501 on the basis of the identification information. The data setting processing means 505 further carries out a processing of setting the distance between the jump origin data and the jump destination data within the aforementioned allowable jump range by an interleave processing of clip data set as a data unit of storage target data on the information recording medium.

The data recording means 506 performs data recording on the information recording medium in a data unit larger than or equal to the consecutive data allocation size determined in the consecutive data allocation size determining means 504.

Figure 13:
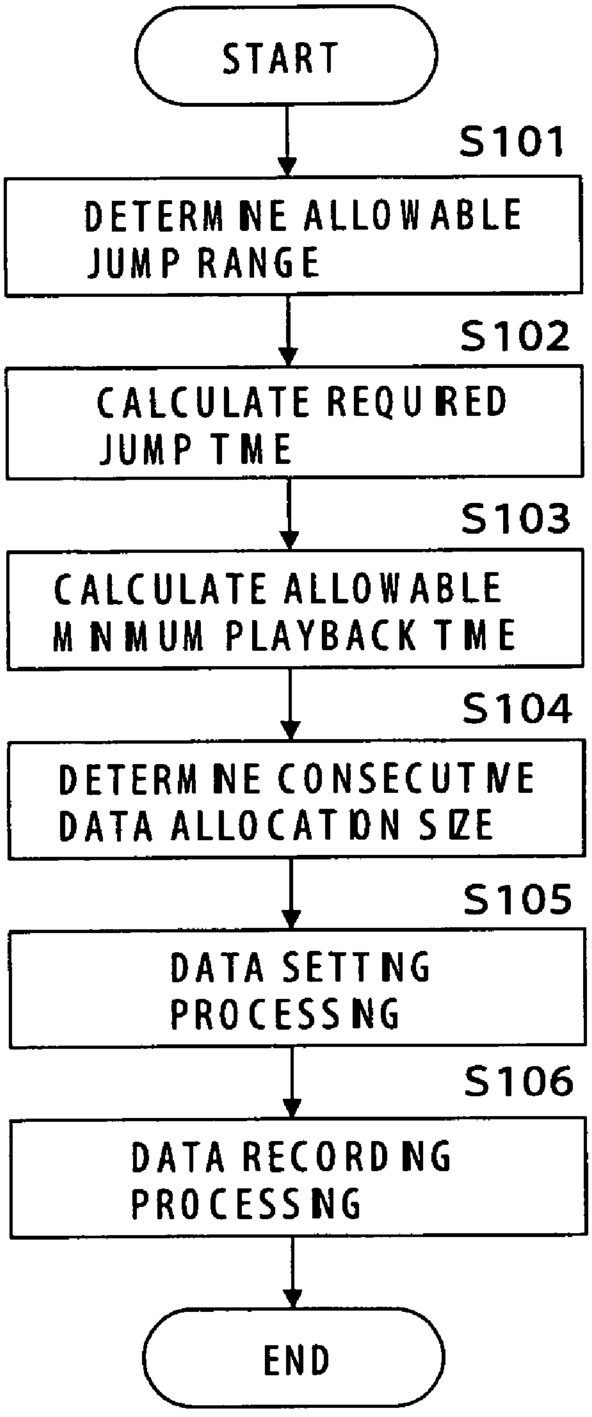
FIG. 13 is a flowchart for explaining a data processing sequence for generating the record data for the information recording medium.
Figure 14:
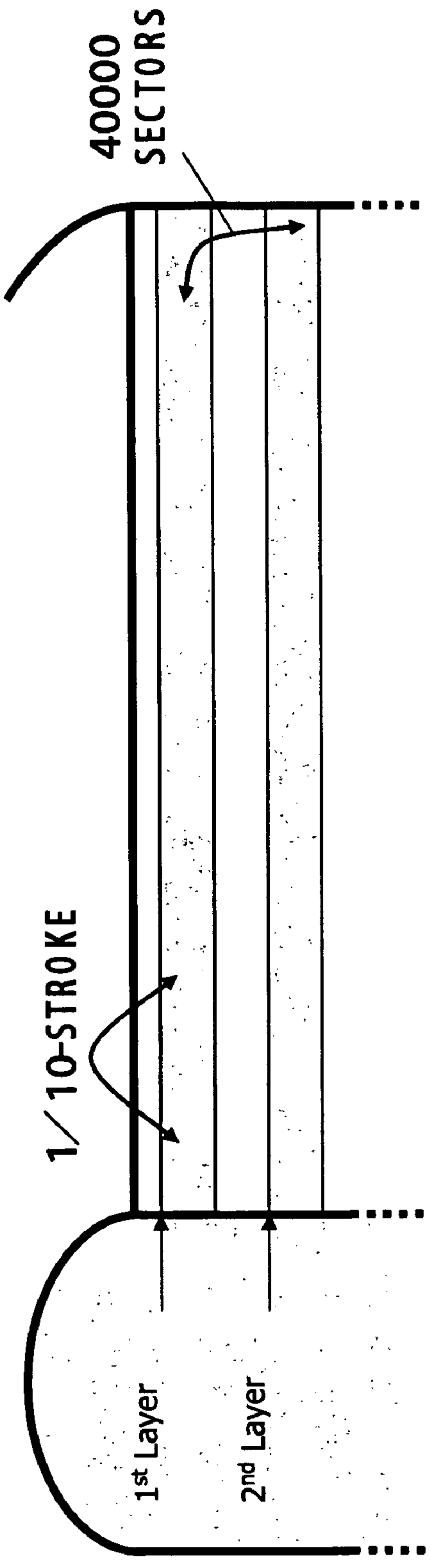
FIG. 14 is a view explaining a jump model that guarantees playback without data break for a jump.

Next, a sequence of the data processing method of the present invention is described with reference to FIG. 13. The data processing of the present invention is a data processing for determining record data allocation on an information recording medium having a plurality of recording layers.

First, in step S101, an allowable range of an intra-layer jump and an inter-layer jump performed in a playback processing of the information recording medium is determined. For example, a processing of setting one of the jump models having been described with reference to FIG. 6 is carried out.

Then, in Step S102, the required jump time is calculated. The time required for each of the intra-layer jump and the inter-layer jump is calculated on the basis of the allowable jump range information determined in the Step S101.

Specifically, the sum of the seek time of the pickup and the overhead time involved in the processing for the read data unit block of the information recording medium is calculated as the required jump time for the intra-layer jump, and the sum of the seek time of the pickup, the pickup adjustment time involved in the inter-layer seek, and the overhead time involved in the processing for the read data unit block of the information recording medium is calculated as the required jump time for the inter-layer jump.

In step S103, an allowable minimum playback time is calculated. In specific, the allowable minimum playback time [t] is calculated on the basis of a jump time [TJUMP], a data read out rate [Rud] from a disc in a drive and a data recording rate [RTS] in accordance with the following equation:

$$t=T\text{JUMP}\times Rud/(Rud-RTS).$$

Next, in step S104, a consecutive data allocation size is determined. The allowable minimum consecutive data size of the data to be stored in the information recording medium is calculated on the basis of the allowable minimum playback time [t] determined in step S103 in accordance with the following equation:

$$U\text{size}=t\times RTS.$$

Next, in step S105, a data setting processing is carried out. In this step, a data setting processing of identifying jump origin data and jump destination data that can be generated in the playback processing of the stored data in the information recording medium and setting a distance between the jump origin data and the jump destination data within the allowable jump range on the basis of the identification information is carried out. Furthermore, a processing of setting the distance between the jump origin data and the jump destination data within the aforementioned allowable jump range by an interleave processing of clip data set as a data unit of storage target data on the information recording medium is carried out.

Lastly, in step S106, a data recording processing is carried out. Data recording on the information recording medium is carried out in a data unit larger than or equal to the consecutive data allocation size on the basis of information determined through the respective processes of steps S101-S105.

According to the above processing steps, the content stored in the information recording medium through the above processing can be seamlessly and consecutively played back without data interruption at the time of jump processing during playback.

Next, a specific processing example realizing the seamless playback will be described. As described with reference to FIG. 6 etc. in the above, a minimum data size to be recorded on a disc, that is, a consecutive data allocation size [Usize] is determined on the basis of a setting mode of the allowable maximum jump distance and a setting mode of a data recording rate (RTS).

Here, as an example, a case where a 1/10-stroke intra-layer jump and a 40000-sector inter-layer jump are set as the allowable maximum jump distance will be described. This setting corresponds to the example of FIG. 6 (A3) described above. A total jump time [TJUMP] in this case is:

(1) 1/10-stroke intra-layer jump $$T\text{JUMP}=650(TACC)+0(TIL)+20(TOH)=670\text{ ms},$$

and (2) 40000-sector inter-layer jump $$T\text{JUMP}=330(TACC)+360(TIL)+20(TOH)=710\text{ ms},$$

and the maximum jump time is determined as 710 ms.

This model is required to determine the data allocation conditions, while limiting the jump distance to the range of about [$1.2\times2^{30}/2048$] sectors as to the intra-layer jump, and the range of 40000 sectors as to the inter-layer jump.

Figure 15:
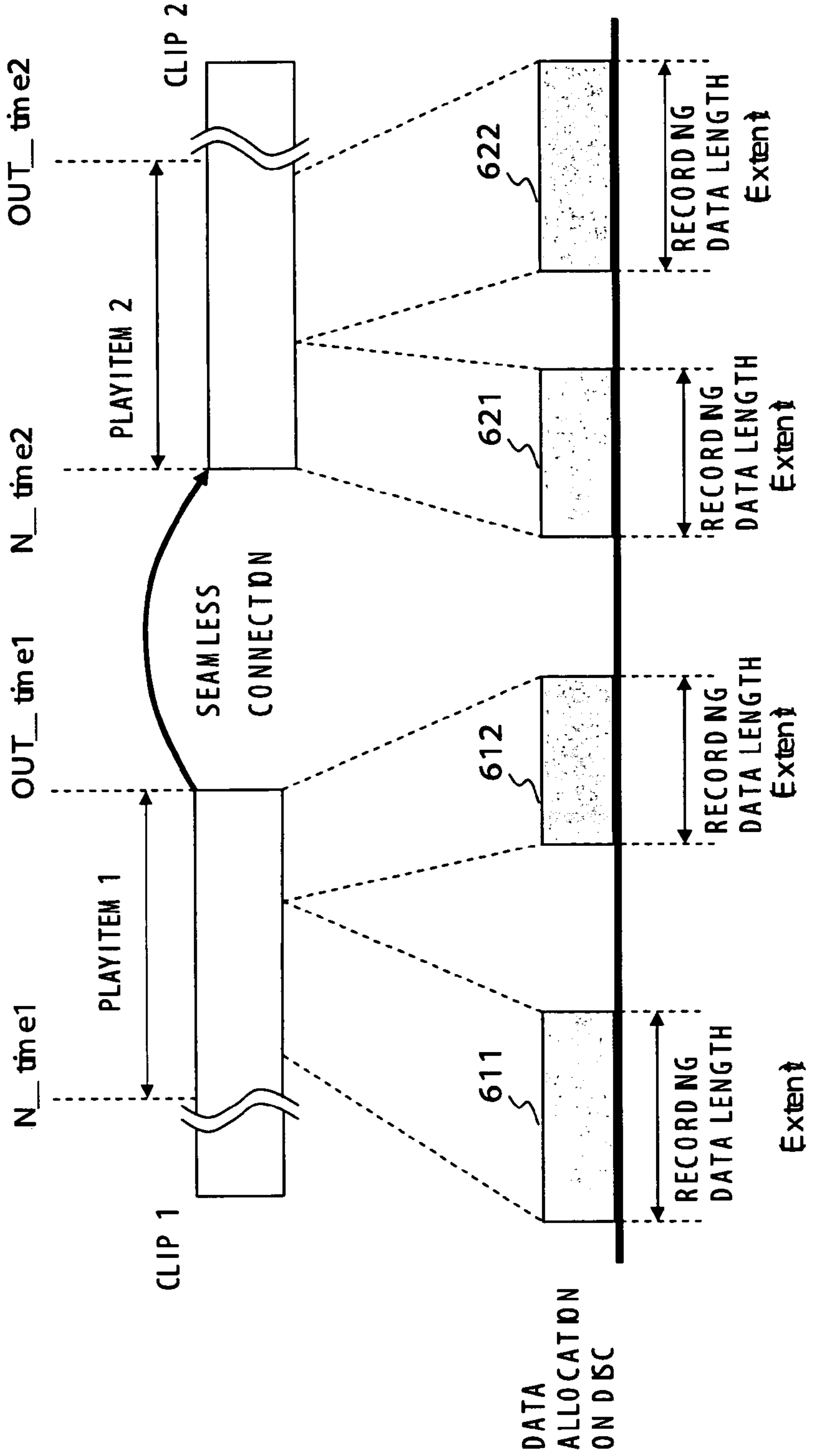
FIG. 15 is a view showing a recording example in an information recording medium with regard to structural data of play items.

Actual data playback sequences have various settings. One example is shown in FIG. 15. The example shown in FIG. 15 is a case where Clip 1 specified as playback target data referred by a PlayItem 1 and Clip 2 referred by a PlayItem 2 to be played back subsequent to the PlayItem 1 are recorded, in which record data of each clip is recorded on the disc in a dispersed manner. The example of the figure shows a case where last two data blocks of Clip 1 are dispersed and recorded on the disc as record data 611 and 621 and first two data blocks of Clip 2 are dispersed and recorded on the disc as record data 621 and 622.

A playback order of the PlayItems is defined in accordance with an ATC (arrival time clock) sequence. The playback timing of each PlayItem is determined on the basis of ATC. For guaranteeing the seamless playback, it is necessary for record data recorded on a disc to comply the rules below:

<Rules> a) It is necessary for a record data block containing data belonging to the ATC sequence corresponding to PlayItem 1 being a preceding playback period to be larger than or equal to the aforementioned minimum data size to be recorded on the disc, that is, the consecutive data allocation size [Usize]. However, in a case of a data block containing the first data of the ATC sequence, it is not essential to satisfy the condition.

b) It is necessary for a record data block containing data belonging to the ATC sequence corresponding to the PlayItem 2 being a subsequent playback period to be larger than or equal to the aforementioned minimum data size to be recorded on the disc, that is, the consecutive data allocation size [Usize]. However, in a case of a data block containing the last data of the ATC sequence, it is not essential to satisfy the condition.

As described in the above with reference to FIG. 7, the allowable minimum playback time [t] corresponding to a minimum data unit to be allocated consecutively in the disc is calculated on the basis of the total jump time [TJUMP], the read out rate [Rud] of the data from the disc in the drive, and the data recording rate [RTS], and a product obtained by multiplying the allowable minimum playback time [t] by the data read out rate [Rud] is calculated as the consecutive data allocation size [Usize]. That is:

$$U\text{size}=Rud\times t$$

As described with reference to FIG. 7 in the above, if a jump occurs, reading of data from the disc is stopped. If there is provided a setting that guarantees that a buffer data size does not reach zero or below even in the occurrence of a jump processing, the seamless playback is made possible without causing any playback break in the jump playback. The [Usize] shown in FIG. 7 corresponds to the size of the data applied to the consecutive reading in the disc without involving the jump processing. This data size is the consecutive data allocation size [Usize].

The allowable minimum playback time [t] of the consecutively allocated data in the disc is calculated on the basis of the total jump time [TJUMP], the rate [Rud] of the reading of the data from the disc in the drive, and the data recording rate [RTS] according to the following expression. That is:

$$t=T\text{jump}\times Rud/(Rud-RTS).$$

If the data has been recorded on the disc as the data block larger than or equal to the allowable minimum playback time [t] of the consecutive data, the buffer data would not be 0 or below at the time of the occurrence of the jump, resulting in the guarantee of the consecutive playback. The value calculated by multiplying the data recording rate [RTS] by the allowable minimum playback time [t] of the consecutive data as having been calculated according to the above expression is obtained as the consecutive data allocation size [Usize]. That is:

$$Usize=RTS\times t.$$

It is assumed that:

the total jump time [TJUMP], the read out rate [Rud] of the data from the disc in the drive, and the data recording rate [RTS]. They are assumed to be as follows, for example:

TJUMP [msec]: Intra-layer access time *TACC*+Inter-layer jump time *TIL*+Overhead *TOH* attributed to the ECC block boundary, Rud [$\times 10^6$ bps]: Read rate=54 Mbps, and RTS [$\times 10^6$ bps]: Maximum recording rate (TS_recording_rate×192/188).

At this time, the allowable minimum playback time [t] of the consecutive data and the consecutive data allocation size [Usize] are calculated as follows:

$$t(\text{msec})=TJUMP\times Rud/(Rud-RTS), \text{ and}$$

$$Usize(\text{Byte})=t/1000\times RTS/8.$$

That is, the minimum data size to be recorded on the disc, that is, the consecutive data allocation size [Usize] is calculated depending on the following equation:

$$S_{EXTENT}[\text{byte}] \geq \frac{T_{JUMP}[\text{ms}]\times R_{UD}[\text{bps}]}{1000\times 8}\times \frac{\text{TS\_recording\_rate [bps]}\times 192}{R_{UD}[\text{bps}]\times 188-\text{TS\_recording\_rate [bps]}\times 192}.$$

On the basis of the above equation, the minimum data size to be recorded on the disc, that is, the consecutive data allocation size [Usize] is set to a size that differs depending on the data recording rate [RTS] and is set as shown in FIG. 16. That is:

$RTS=5\times 10^6$ bps→consecutive data allocation size [Usize]$=0.5\times 2^{20}$ byte $RTS=5\times 10^6$ bps→consecutive data allocation size [Usize]$=0.5\times 2^{20}$ byte $RTS=10\times 10^6$ bps→consecutive data allocation size [Usize]$=1.1\times 2^{20}$ byte $RTS=20\times 10^6$ bps→consecutive data allocation size [Usize]$=2.8\times 2^{20}$ byte $RTS=30\times 10^6$ bps→consecutive data allocation size [Usize]$=6.0\times 2^{20}$ byte $RTS=40\times 10^6$ bps→consecutive data allocation size [Usize]$=14.2\times 2^{20}$ byte $RTS=48\times 10^6$ bps→consecutive data allocation size [Usize]$=45.1\times 2^{20}$ byte.

Recording of data having these data size on a disc makes a seamless playback processing possible without generating data break even in a case of allowing a jump within a predetermined range.

The data processing for determining record data allocation on an information recording medium is carried out through a first step of executing a data size determining processing of determining a data size as a minimum size of data to be stored in the information recording medium on the basis of allowable jump range information determined as an allowable range of a jump processing in a playback processing of the information recording medium, and a second step of a data allocation determining processing of determining a data recording configuration in which a data block having the determined data size is so allocated as to be playable in the jump processing within the allowable jump range. The data processing apparatus executing these processes, that is, a data processing apparatus having data size determining processing means and data allocation determining processing means determines data allocation and performs data recording.

It is noted that in the data size determining processing, a data size as the minimum size of data to be stored in the information recording medium on the basis of the allowable jump range of the intra-layer jump and the inter-layer jump. In the size determining processing, the data size is determined on the basis of a table shown in FIG. 16, in which the data recording rate [RTS] is made corresponding to the allowable minimum data size of the data to be stored in the information recording medium, or on the basis of a relational expression of the aforementioned data recording rate [RTS] and the allowable minimum data size of the data to be stored in the information recording medium.

Figure 17:
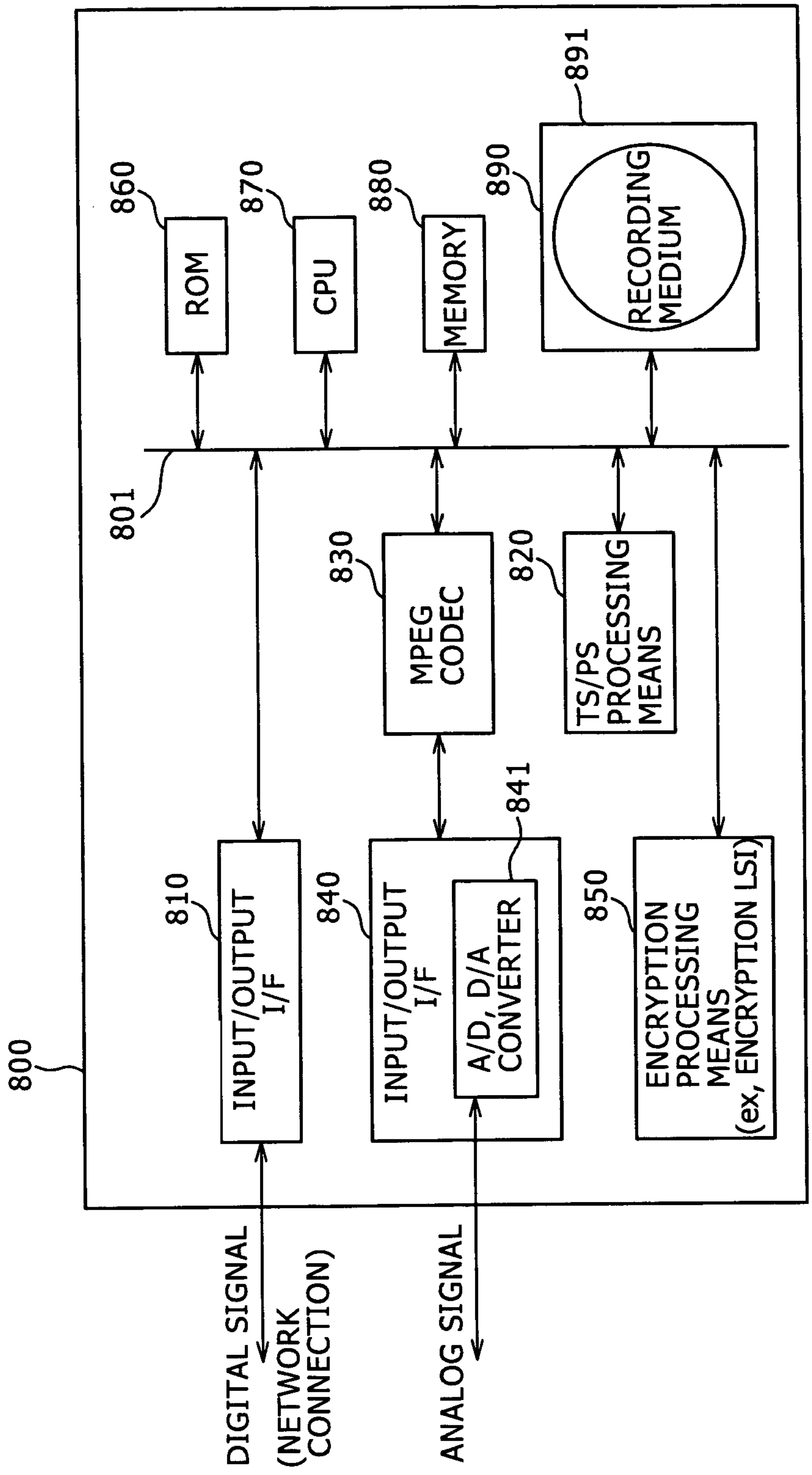
FIG. 17 is a view for explaining a structural example of a data processing apparatus performing a data recording processing on the information recording medium or a playback processing therefrom.

Next, an embodiment of the configuration of the data processing apparatus that performs the above data processing, and further, mounts an information recording medium and performs a data recording and playback processing will be described with reference to FIG. 17. The data processing apparatus of FIG. 12 is shown in the form of a block diagram for illustrating the functions of the present invention, and the data processing apparatus of FIG. 17 is shown in the form of a view for illustrating a specific hardware configuration of performing the functions shown in FIG. 12.

A data processing apparatus 800 has a drive 890 that drives an information recording medium 891 to perform the input and the output of a data recording playback signal, a CPU 870 that performs the data processing in accordance with various programs, a ROM 860 available as a storage area for the programs and the parameters etc., a memory 880, an input/output I/F 810 that performs the input and the output of a digital signal, an input/output I/F 840 that performs the input and the output of an analog signal and has an A/D and D/A converter 841, an MPEG codec 830 that performs the encoding and the decoding of the MPEG data, TS/PS processing means 820 that performs the TS (Transport Stream)/PS (Program Stream) processing, and encryption processing means 850 that performs various encryption processing, and each block is connected to a bus 801.

An operation at the time of the data recording is firstly described. Two cases, that is, a case of digital signal input and a case of analog signal input case, are assumed for the data to be recorded.

In the case of the digital signal, the digital signal is supplied through the digital signal input/output I/F 810, and the data obtained through an appropriate encryption processing using the encryption processing means 850 at need is stored in the information recording medium 891. Alternatively, when storing the data through a change of the data format of the supplied digital signal, the data is stored in the information recording medium 891 through the appropriate encryption processing using the encryption processing means 850 after the change into a storage data format using the MPEG codec 830, the CPU 870, and the TS/PS processing means 820.

In the case of the analog signal, the analog signal supplied to the input/output I/F 840 is converted into the digital signal using the A/D converter 841, and is further changed, using the MPEG codec 803, into a codec available at the time of the recording. Then, the change into AV multiplexed data available as the format of the recording data is performed using the TS/PS processing means 820, and the data obtained through the appropriate encryption processing using the encryption processing means 850 at need is stored in the recording medium 891.

In the case of the recording of the content composed of the AV stream data formed with the MPEG-TS data, for instance, the content is encrypted with the encryption processing means 850 using a unit key after the segmentation of the content into content management units (content protection system (CPS) units), and are then recorded in the recording medium 891 through the drive 890.

The processing applied to the case of the data playback from the information recording medium is now described. When performing the playback of the AV stream data composed of the MPEG-TS data specified as the content, for instance, an identification of the content management unit is applied to the data read from the information recording medium 891 through the drive 890. Then, the processing of acquiring the unit key corresponding to the identified content management unit is performed, leading to a separation of the data into the Video, the Audio, and the subtitle etc. using the TS (Transport Stream)/PS (Program Stream) processing means 820 through a decryption by the encryption processing means 850 based on the acquired unit key.

The digital data decoded with the MPEG decoder 830 is outputted through the conversion into the analog signal with the D/A converter 841 in the input/output I/F 840. Alternatively, in a case of the digital output, the MPEG-TS data decoded with the encryption processing means 850 is outputted as the digital data through the input/output I/F 810. The output in this case is provided for a digital interface such as IEEE 1394, an Ethernet cable, and a wireless LAN. It is noted that, in a case of supporting a network connection function, the input/output I/F 810 provides a function of the network connection. Further, in a case of the output through the change of the data into a format acceptable to an output destination apparatus within the playback apparatus, the rate conversion and codec conversion processing is once applied in the MPEG codec 830 to the Video, the Audio and the subtitle etc. that are obtained through the separation by the TS/PS processing means 820, in which case, the data obtained by being multiplexed again with the MPEG-TS and MPEG-PS etc. by the TS/PS processing means 820 is outputted through the digital input/output I/F 810. Alternatively, the CPU 870 may be used to output the data through the digital input/output I/F 810 after the conversion into the codec and the multiplexed file other than the MPEG data.

It is noted that the program that implements the playback and recording processing is stored in the ROM 860, and in the course of running of the program, the memory 880 is used for the storage of the parameters and the data and also as a work area at need. It is noted that, while FIG. 17 has described the apparatus configuration capable of performing the data recording and playback, an apparatus that provides only the playback function and an apparatus that provides only the recording function are supposed to be also configurable, and the present invention may be also applied to these apparatuses.

In the foregoing, the present invention has been described in detail with reference to the specific embodiments. However, it is to be understood that it is obvious to those skilled in the art that modifications and changes of the embodiments are possible without departing from the scope of the present invention. That is, it is to be understood that a disclosure of the present invention is given in the form of illustrations and not restrictive. In order to judge the gist of the present invention, the scope of patent claims should be taken into consideration.

It is noted that a series of the processing having been described in the specification may be performed with the hardware, the software or a combination of the hardware with the software. In the case of the processing with the software, the program containing the processing sequence is allowed to run through an installation of the program into the memory in the computer incorporated in the dedicated hardware, or into a general-purpose computer capable of performing various processing.

The program may be contained preliminarily in the recording medium such as the hard disc and the ROM (Read Only Memory), for instance. Alternatively, the program may be temporarily or permanently written in a removable recording medium such as a flexible disc, a Compact Disc Read Only Memory (CD-ROM), a Magneto Optical (MO) disc, a Digital Versatile Disc (DVD), a magnetic disc, and a semiconductor memory. The removable recording medium described above may be provided as so-called package software.

It is noted that, in addition to the installation from the above removable recording medium into the computer, the program may be wirelessly transferred from a download site into the computer, or wire-transferred to the computer through the network such as the LAN (Local Area Network) and the Internet, in which case, the computer may receive the program transferred as described above to install into the incorporated recording medium such as the hard disc.

It is noted that the various processing stated in the specification may be performed not only in time series according to the description but also in parallel or individually depending on the processing capability of the apparatus that performs the processing, or at need. Further, the system stated in the specification is in the form of a logical aggregate composed of more than one unit, and the units contained in the logical aggregate are not always incorporated in an identical casing.

INDUSTRIAL APPLICABILITY

As described above, according to the structure of the present invention, since, for example, in a multilayer disc, such as a Blu-ray disc, a DVD disc and the like, having a plurality of recording layers, an allowable range of an intra-layer jump and an inter-layer jump carried out in a playback processing of an information recording medium is determined and a required time for the intra-layer jump and the inter-layer jump is calculated on the basis of the determined allowable jump range information so as to determine a data configuring condition such as an allowable minimum consecutive data size of data to be stored in the information recording medium on the basis of the calculated required jump time, generation of record data, data recording and playback guaranteeing seamless playback even in a case of occurrence of an inter-layer jump as well as an intra-layer jump at the time of playing back a disc-type recoding medium having a plurality of recording layers are made possible.

According to the present invention, data allocation conditions supporting jump models defining various allowable jump conditions can be acquired, and performing data recording in accordance with a data allocation condition supporting each allowable jump condition enables generation of record data, data recording and playback guaranteeing a playback processing without data break at the time of the intra-layer jump and the inter-layer jump possibly occurring during playback.

Furthermore, according to the present invention, it is possible to clearly calculate a level of degradation of editorial flexibility due to increased read out buffer size caused by increase of the allowable jump time (distance) and increased size of the consecutive data allocation size [Usize], so that determination of an optimum buffer size and consecutive data allocation size [Usize] is made possible by carrying out handling suitable for each level. Thus, performing content recording on the basis of the determined information enables generation of record data, data recording and playback guaranteeing a playback processing without data break.

Furthermore, according to the configuration of the present invention, a data configuration incapable of consecutive playback at the time of jump due to the increased number of consecutive clips and difference in data length of the consecutive clips is analyzed to set a parameter having, for example, relation between a maximum number of consecutive clips, or a length of a clip to be used for a multi-story, and data size as a limit value and to produce content based on authoring software in which the parameter is set. Accordingly, generation of record data, data recording and playback guaranteeing a playback processing without data break at the time of the intra-layer jump and the inter-layer jump possibly occurring during playback are made possible.

The invention claimed is:

1. A data processing method for determining record data allocation on an information recording medium having a plurality of recording layers, the method comprising:

an allowable jump range determining step of determining, in a decoding unit, an allowable range of an intra-layer jump and an inter-layer jump performed in a playback processing of said information recording medium, the allowable range of the inter-layer jump being no more than 40,000 sectors, and the allowable range of the intra-layer jump being 1/10-stroke, a full stroke being equivalent to a range from an innermost side to an outermost side of the recording medium, and the 40,000 sectors being less than the 1/10-stroke;

a required jump time calculating step of calculating, in the decoding unit, a required time for the intra-layer jump and the inter-layer jump on the basis of allowable jump range information determined in said allowable jump range determining step; and a consecutive data allocation size determining step of determining, in the decoding unit, an allowable minimum consecutive data size of data to be stored in the information recording medium on the basis of the required jump time calculated in said required jump time calculating step.

2. The data processing method as claimed in claim 1, wherein:

said required jump time calculation step is a step of calculating:

as to an intra-layer jump, a sum of a seek time of a pickup and an overhead time involved in a processing for a read data unit block of the information recording medium, and as to an inter-layer jump, a sum of the seek time of the pickup, a pickup adjustment time involved in an inter-layer seek, and an overhead time involved in a processing for a read data unit block of said information recording medium.

3. The data processing method as claimed in claim 1, wherein:

said consecutive data allocation size determining step is a step including an allowable minimum playback time determining step of determining an allowable minimum playback time as a playback time corresponding to the allowable minimum consecutive data size of the data to be stored in the information recording medium, and determining the allowable minimum consecutive data size of the data to be stored in the information recording medium on the basis of said allowable minimum playback time.

4. The data processing method as claimed in claim 3, wherein:

said allowable minimum playback time determining step is a step of calculating the allowable minimum playback time [t] on the basis of a jump time [TJUMP], a data read out rate [Rud] from a disc in a drive and a data recording rate [RTS] in accordance with the following equation:

$$t = TJUMP \times Rud/(Rud - RTS);$$ and said consecutive data allocation size determining step is a step of determining the allowable minimum consecutive data size of the data to be stored in the information recording medium on the basis of the allowable minimum playback time [t] calculated by said equation in accordance with the following equation:

$$Usize = t \times RTS.$$

5. The data processing method as claimed in claim 1, further comprising:

a data setting processing step of identifying jump origin data and jump destination data that can be generated in the playback processing of the stored data in the information recording medium and setting a distance between the jump origin data and the jump destination data within the allowable jump range determined in said allowable jump range determining step.

6. The data processing method as claimed in claim 5, wherein:

said data setting processing step carries out a processing of setting the distance between the jump origin data and the jump destination data within said allowable jump range by an interleave processing of clip data set as a data unit of storage target data on the information recording medium.

7. The data processing method as claimed in claim 1, further comprising:

a data recording step of performing data recording on the information recording medium in a data unit larger than or equal to the consecutive data allocation size determined in said consecutive data allocation size determining step.

8. A data processing apparatus for determining record data allocation on an information recording medium having a plurality of recording layers, said apparatus comprising:

allowable jump range determining means that determines an allowable range of an intra-layer jump and an inter-layer jump performed in a playback processing of said information recording medium, the allowable range of the inter-layer jump being no more than 40,000 sectors, and the allowable range of the intra-layer jump being 1/10-stroke, a full stroke being equivalent to a range from an innermost side to an outermost side of the recording medium, and the 40,000 sectors being less than the 1/10-stroke;

required jump time calculating means that calculates a required time for the intra-layer jump and the inter-layer jump on the basis of allowable jump range information determined by said allowable jump range determining means; and consecutive data allocation size determining means that determines an allowable minimum consecutive data size of data to be stored in the information recording medium on the basis of the required jump time calculated by said required jump time calculating means.

9. The data processing apparatus as claimed in claim 8, wherein:

said required jump time calculating means calculates:

as to an intra-layer jump, a sum of a seek time of a pickup and an overhead time involved in a processing for a read out data unit block of the information recording medium, and as to an inter-layer jump, a sum of the seek time of the pickup, a pickup adjustment time involved in an inter-layer seek, and an overhead time involved in a processing for a read out data unit block of said information recording medium.

10. The data processing apparatus as claimed in claim 8, wherein:

said data processing apparatus further includes allowable minimum playback time determining means that determines an allowable minimum playback time as a playback time corresponding to the allowable minimum consecutive data size of the data to be stored in the information recording medium, and said consecutive data allocation size determining means is configured to determine the allowable minimum consecutive data size of the data to be stored in the information recording medium on the basis of said allowable minimum playback time.

11. The data processing apparatus as claimed in claim 10, wherein:

said allowable minimum playback time determining means is configured to calculate the allowable minimum playback time [t] on the basis of a jump time [TJUMP], a data read out rate [Rud] from a disc in a drive and a data recording rate [RTS] in accordance with the following equation:

$t=T\text{JUMP}\times Rud/(Rud-RTS)$; and said consecutive data allocation size determining means is configured to determine the allowable minimum consecutive data size of the data to be stored in the information recording medium on the basis of the allowable minimum playback time [t] calculated by said equation in accordance with the following equation:

$U\text{size}=t\times RTS.$

12. The data processing apparatus as claimed in claim 8, wherein:

said data processing apparatus further has data setting processing means that identifies jump origin data and jump destination data that can be generated in the playback processing of the stored data in the information recording medium and sets a distance between the jump origin data and the jump destination data within the allowable jump range determined in the said allowable jump range determining means.

13. The data processing apparatus as claimed in claim 12, wherein:

said data setting processing means is configured to carry out a processing of setting the distance between the jump origin data and the jump destination data within said allowable jump range by an interleave processing of clip data set as a data unit of storage target data on the information recording medium.

14. The data processing apparatus as claimed in claim 8, wherein:

said data processing apparatus further has data recording means that performs data recording on the information recording medium in a data unit larger than or equal to the consecutive data allocation size determined in said consecutive data allocation size determining step.

15. A non-transitory computer readable medium including computer executable instructions for executing a data processing for determining record data allocation on an information recording medium having a plurality of recording layers, said computer executable instructions causing a computer to execute:

an allowable jump range determining step of determining an allowable range of an intra-layer jump and an inter-layer jump performed in a playback processing of said information recording medium, the allowable range of the inter-layer jump being no more than 40,000 sectors, and the allowable range of the intra-layer jump being 1/10-stroke, a full stroke being equivalent to a range from an innermost side to an outermost side of the recording medium, and the 40,000 sectors being less than the 1/10-stroke;

a required jump time calculating step of calculating a required time for the intra-layer jump and the inter-layer jump on the basis of allowable jump range information determined in said allowable jump range determining step; and a consecutive data allocation size determining step of determining an allowable minimum consecutive data size of data to be stored in the information recording medium on the basis of the required jump time calculated in said required jump time calculating step.

16. A data processing method for determining record data allocation on an information recording medium, said method comprising:

a data size determining step of determining, in a decoding unit, a data size as a minimum size of data to be stored in the information recording medium on the basis of allowable jump range information determined as an allowable range of at least an inter-layer jump processing in a playback processing of said information recording medium, the allowable range of the inter-layer jump being no more than 40,000 sectors, and the allowable range of the intra-layer jump being 1/10-stroke, a full stroke being equivalent to a range from an innermost side to an outermost side of the recording medium, and the 40,000 sectors being less than the 1/10-stroke; and a data allocation determining step of determining, in the decoding unit, a data recording configuration in which a data block having said data size is so allocated as to be playable in the jump processing within said allowable jump range.

17. The data processing method as claimed in claim 16, wherein:

said data size determining step is a step of determining a data size as a minimum size of data to be stored in the information recording medium on the basis of the allowable jump range information of an intra-layer jump and an inter-layer jump.

18. The data processing method as claimed in claim 16, wherein:

said data size determining step is a step of determining a data size on the basis of a table in which a data recording rate [RTS] is made corresponding to the allowable minimum data size of the data to be stored in the information recording medium.

19. The data processing method as claimed in claim 16, wherein:

said data size determining step is a step of determining a data size on the basis of a relational expression between a data recording rate [RTS] and the allowable minimum data size of the data to be stored in the information recording medium.

20. The data processing method as claimed in claim 19, wherein:

said relational expression is an expression shown by the following equation:

$$S_{EXTENT}[\text{byte}] \geq \frac{T_{JUMP}[\text{ms}] \times R_{UD}[\text{bps}]}{1000 \times 8} \times \frac{\text{TS\_recording\_rate[bps]} \times 192}{R_{UD}[\text{bps}] \times 188 - \text{TS\_recording\_rate[bps]} \times 192},$$

setting that an allowable minimum data size of the data to be stored in the information recording medium is $S_{EXTENT}$, a total jump time is $T_{JUMP}$, a data read out rate from a disc in a drive is $R_{ud}$, and a data recording rate [RTS] is $TS_{recording\ rate}$.

21. A data processing apparatus for determining record data allocation on an information recording medium, said apparatus comprising:

a data size determining apparatus that determines a data size as a minimum size of data to be stored in the information recording medium on the basis of allowable jump range information determined as an allowable range of at least an inter-layer jump processing in a playback processing of said information recording medium, the allowable range of the inter-layer jump being no more than 40,000 sectors, and the allowable range of the intra-layer jump being 1/10-stroke, a full stroke being equivalent to a range from an innermost side to an outermost side of the recording medium, and the 40,000 sectors being less than the 1/10-stroke; and a data allocation determining apparatus that determines a data recording structure in which a data block having said data size is so allocated as to be playable in the jump processing within said allowable jump range.

22. The data processing apparatus as claimed in claim 21, wherein:

said data size determining means is configured to determine a data size as a minimum size of data to be stored in the information recording medium on the basis of the allowable jump range information of an intra-layer jump and an inter-layer jump.

23. The data processing apparatus as claimed in claim 21, wherein:

said data size determining apparatus is configured to determine a data size on the basis of a table in which a data recording rate [RTS] is made corresponding to the allowable minimum data size of the data to be stored in the information recording medium.

24. The data processing apparatus as claimed in claim 21, wherein:

said data size determining apparatus is configured to determine a data size on the basis of a relational expression between a data recording rate [RTS] and the allowable minimum data size of the data to be stored in the information recording medium.

25. The data processing apparatus as claimed in claim 24, wherein:

said relational expression is an expression shown by the following equation:

$$S_{EXTENT}[\text{byte}] \geq \frac{T_{JUMP}[\text{ms}] \times R_{UD}[\text{bps}]}{1000 \times 8} \times \frac{\text{TS\_recording\_rate[bps]} \times 192}{R_{UD}[\text{bps}] \times 188 - \text{TS\_recording\_rate[bps]} \times 192},$$

setting that an allowable minimum data size of the data to be stored in the information recording medium is $S_{EXTENT}$, a total jump time is $T_{JUMP}$, a data read out rate from a disc in a drive is $R_{ud}$, and a data recording rate [RTS] is $TS_{recording\ rate}$.

26. A non-transitory computer readable medium including computer executable instructions for executing a record data allocation determining processing on an information recording medium, said computer executable instructions causing a computer to execute:

a data size determining step of determining a data size as a minimum size of data to be stored in the information recording medium on the basis of allowable jump range information determined as an allowable range of at least an inter-layer jump processing in a playback processing of said information recording medium, the allowable range of the inter-layer jump being no more than 40,000 sectors, and the allowable range of the intra-layer jump being 1/10-stroke, a full stroke being equivalent to a range from an innermost side to an outermost side of the recording medium, and the 40,000 sectors being less than the 1/10-stroke; and a data allocation determining step of determining a data recording structure in which a data block having said data size is so allocated as to be playable in the jump processing within said allowable jump range.

* * * * *